United States Patent
Tai

(10) Patent No.: US 7,438,309 B2
(45) Date of Patent: Oct. 21, 2008

(54) PORTABLE TRAILER

(76) Inventor: Jen-Lung David Tai, 19507 N. 65th Ave., Glendale, AZ (US) 85308

( * ) Notice: Subject to any disclaimer, the term of this patent is extended or adjusted under 35 U.S.C. 154(b) by 3 days.

(21) Appl. No.: 11/674,953

(22) Filed: Feb. 14, 2007

(65) Prior Publication Data

US 2007/0132211 A1 Jun. 14, 2007

Related U.S. Application Data

(63) Continuation of application No. 11/234,491, filed on Sep. 23, 2005, now Pat. No. 7,178,823.

(51) Int. Cl.
*B62B 1/00* (2006.01)
(52) U.S. Cl. .................................................... 280/656
(58) Field of Classification Search ................ 280/638, 280/415.1, 43, 656, 46; 296/181, 182, 26.01, 296/26.03; 414/538, 559, 539, 482, 494, 414/500; D12/101, 106
See application file for complete search history.

(56) References Cited

U.S. PATENT DOCUMENTS

| | | |
|---|---|---|
| 1,443,594 A | 1/1923 | Saives |
| 2,048,580 A | 7/1936 | Webber |
| 2,254,437 A | 9/1941 | Marney |
| 2,328,138 A | 8/1943 | Gosser |
| 2,490,014 A | 12/1949 | Brand |
| 2,549,018 A | 4/1951 | Sarlo |
| 3,877,714 A | 4/1975 | Black |
| 4,305,695 A | 12/1981 | Zachrich |
| 4,746,142 A * | 5/1988 | Davis ..................... 280/656 |
| 4,758,008 A | 7/1988 | Moddejonge |
| 4,786,073 A | 11/1988 | Harper |
| 5,354,090 A | 10/1994 | Grovom |
| 5,556,249 A | 9/1996 | Heine |
| 5,570,898 A * | 11/1996 | Albert ..................... 280/656 |
| 5,743,541 A | 4/1998 | Cook |
| 5,769,449 A | 6/1998 | Keesee |
| 5,934,863 A | 8/1999 | Beck |
| 6,089,816 A | 7/2000 | Christ |
| 6,149,372 A | 11/2000 | Lee et al. |
| 6,254,117 B1 | 7/2001 | Cross |
| 6,328,364 B1 | 12/2001 | Darbishire |
| 6,511,092 B1 | 1/2003 | Chepa |
| 6,623,028 B1 | 9/2003 | Johnston |
| 6,767,025 B2 | 7/2004 | Hagen |
| 6,955,375 B2 * | 10/2005 | Thurm ..................... 280/656 |
| 7,004,495 B2 * | 2/2006 | Thurm ..................... 280/656 |
| 7,040,643 B1 | 5/2006 | Eliades |
| 7,055,848 B1 * | 6/2006 | James ..................... 280/656 |
| 7,059,626 B2 | 6/2006 | Koch |
| 7,083,219 B1 | 8/2006 | Gregory |
| 7,258,362 B2 * | 8/2007 | Thurm ..................... 280/656 |

* cited by examiner

*Primary Examiner*—Christopher Ellis
*Assistant Examiner*—Brian Swenson
(74) *Attorney, Agent, or Firm*—Parsons & Goltry; Michael W. Goltry; Robert A. Parsons

(57) ABSTRACT

A transport vehicle includes a bed formed in the rear end thereof. A base is seated on the bed and supports a load-bearing platform opposing the bed forming a storage space therebetween and an opening therebetween into the storage space at the rear end of the vehicle. A wheeled trailer is also provided, which is positionable in the storage space, is removable from the storage space, and has a hitched drawbar engagable to a tow bat secured to the rear of the vehicle.

7 Claims, 22 Drawing Sheets

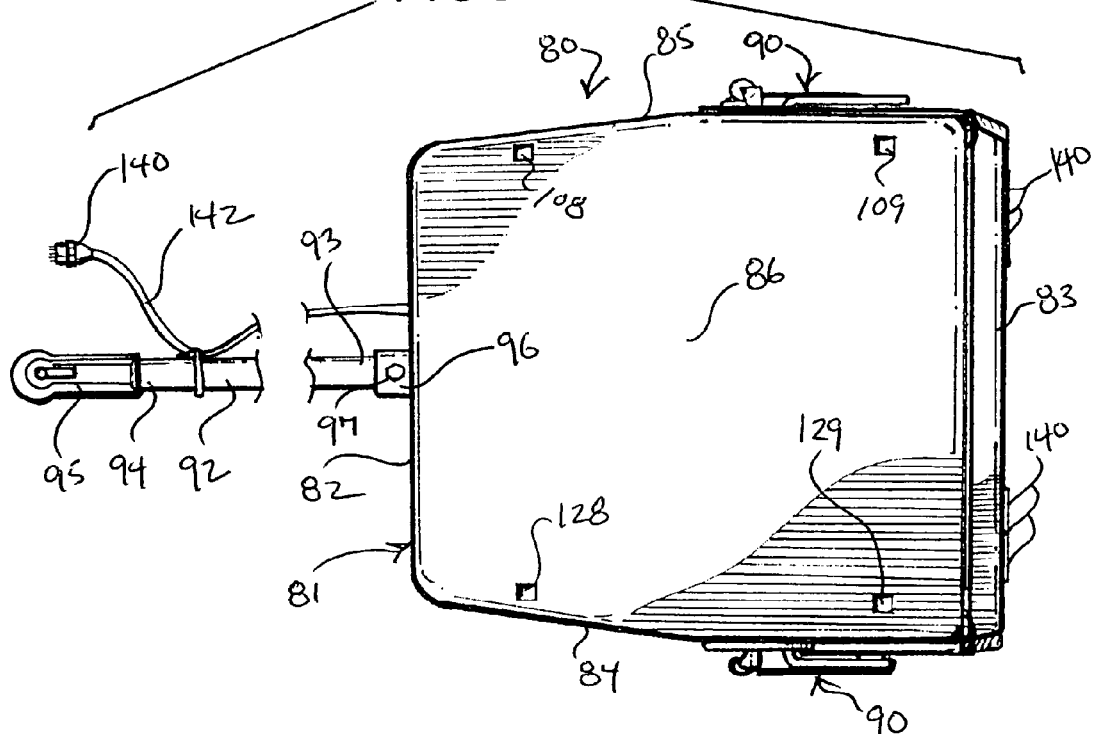
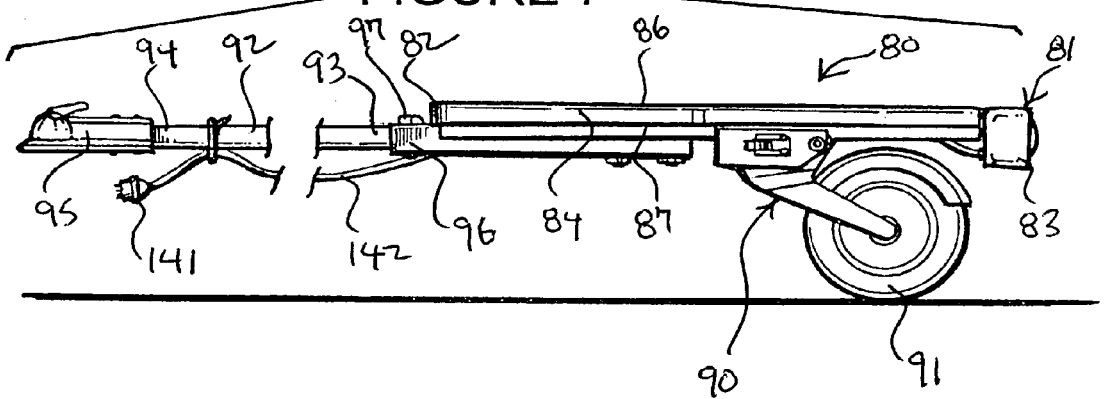

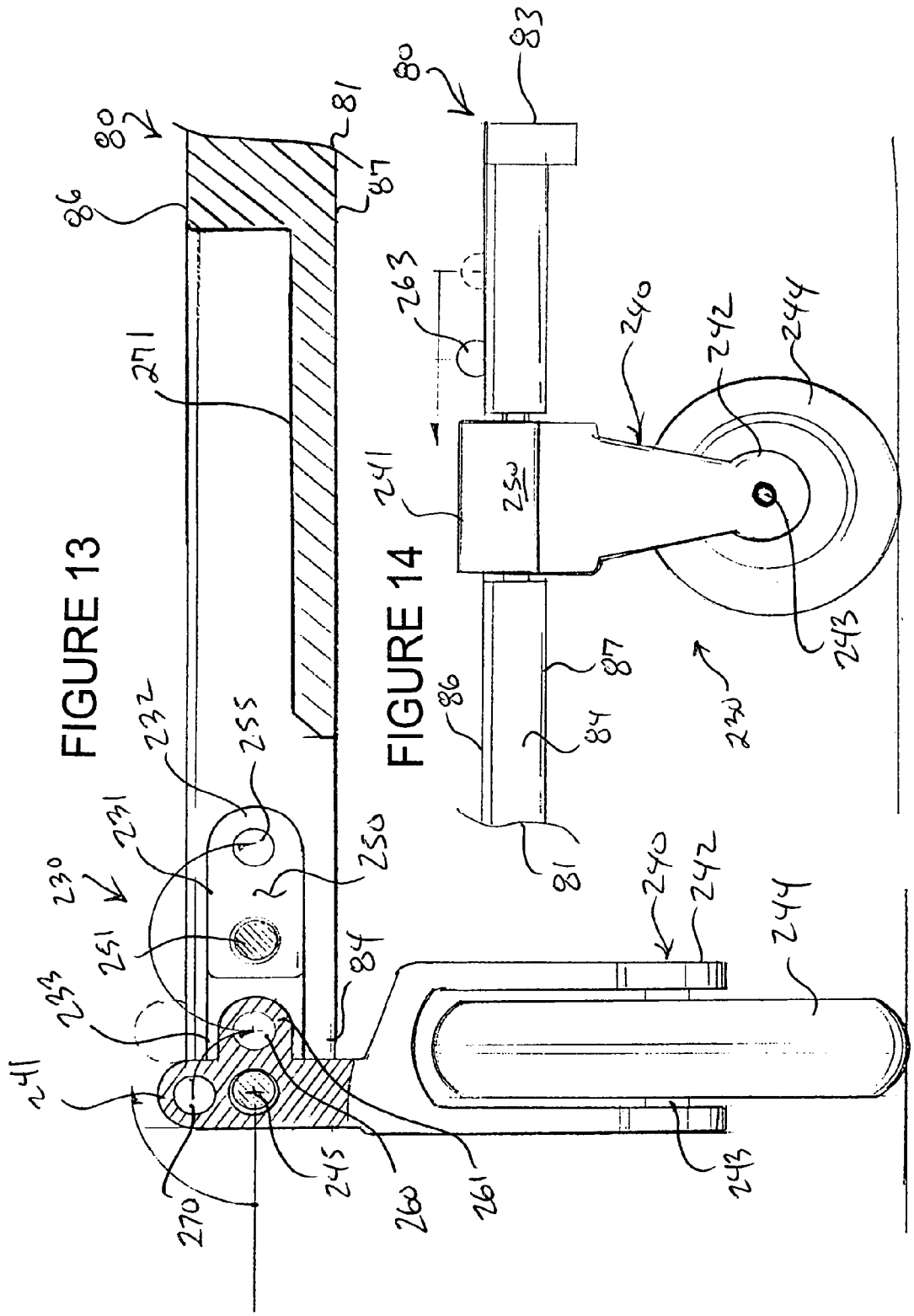

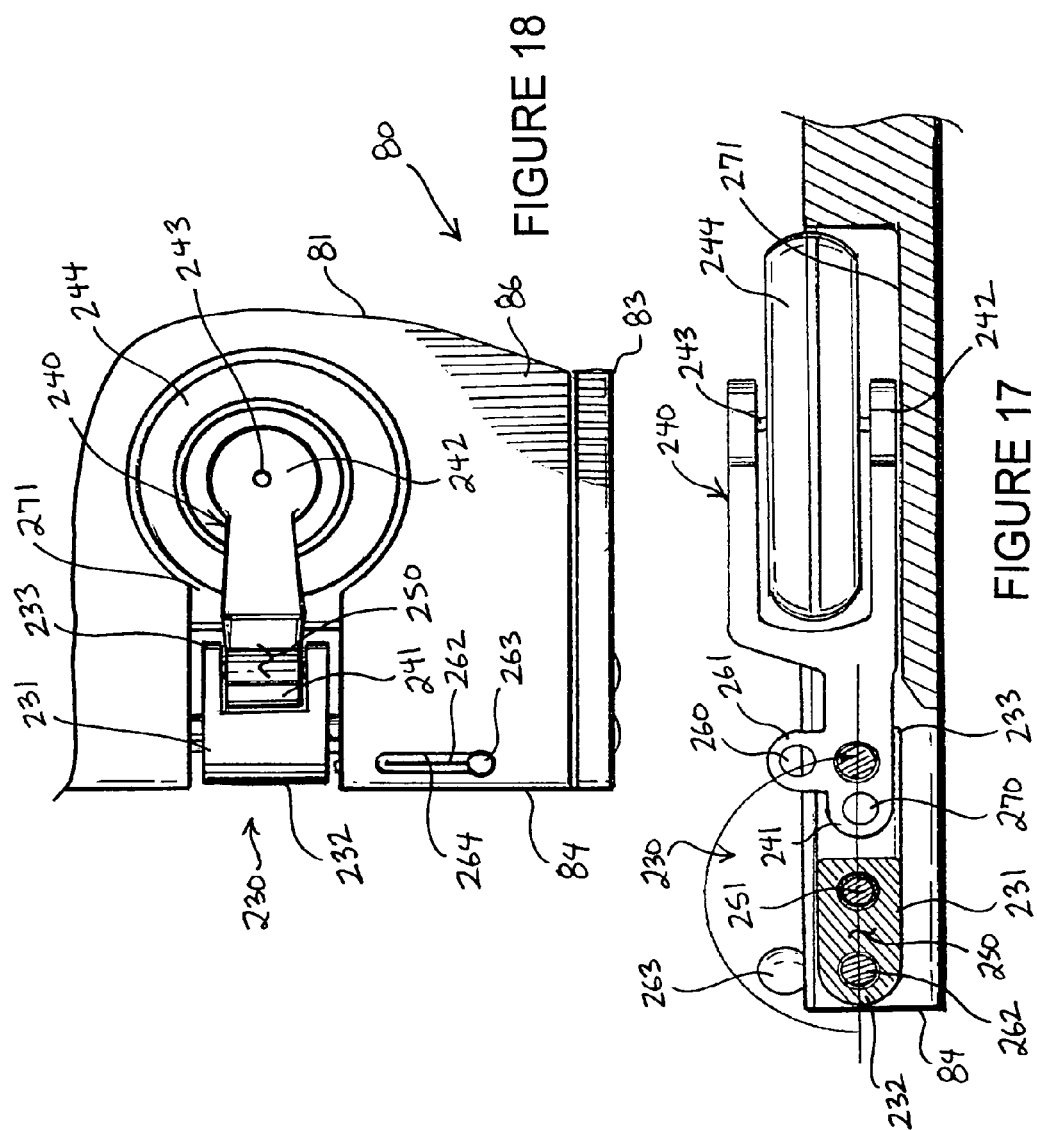

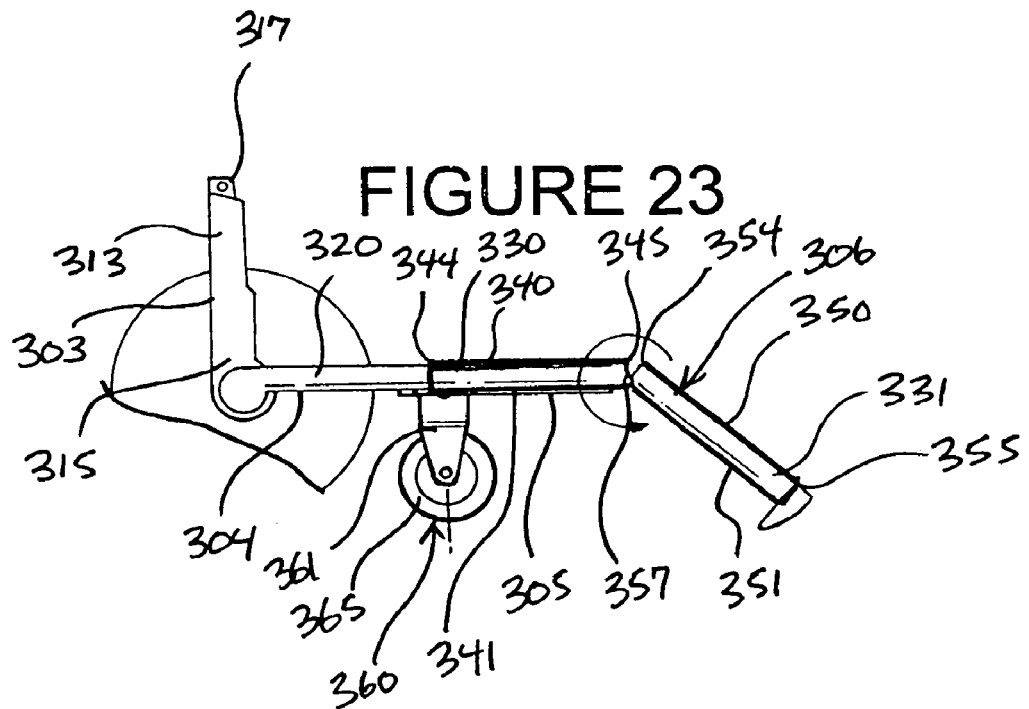
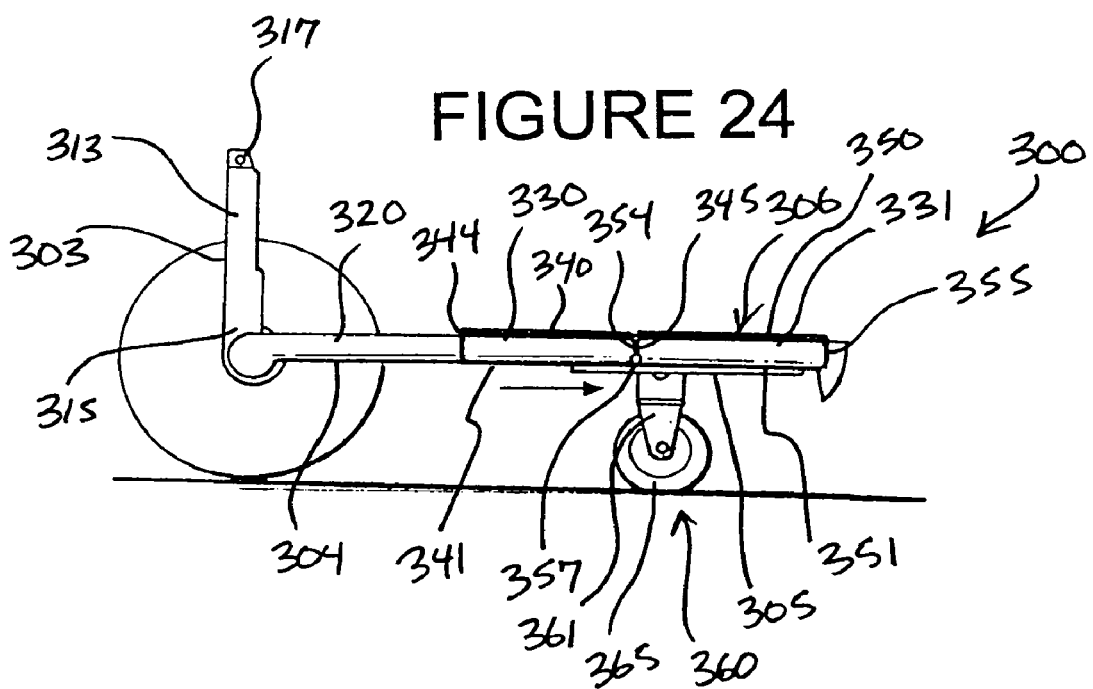

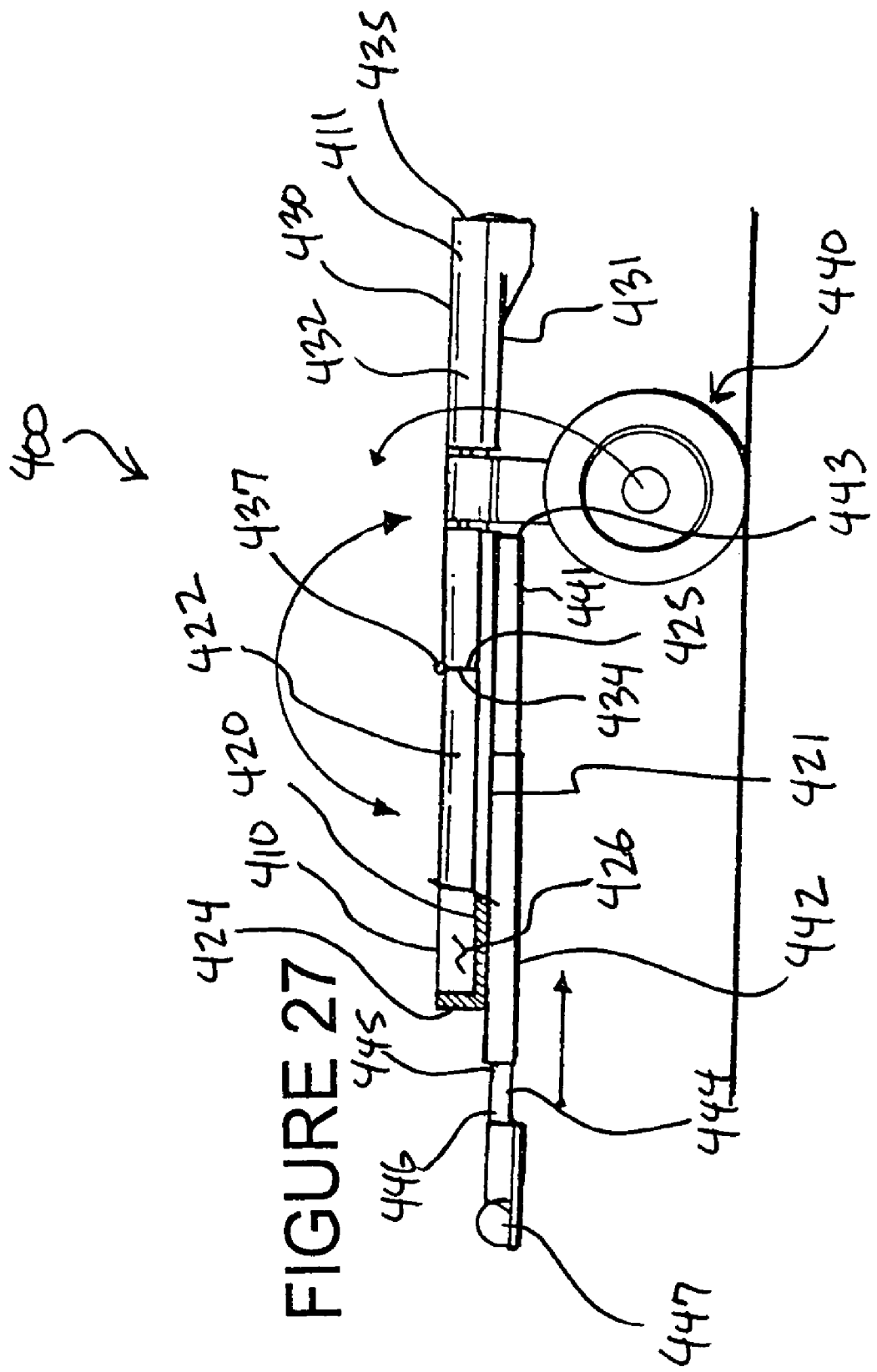

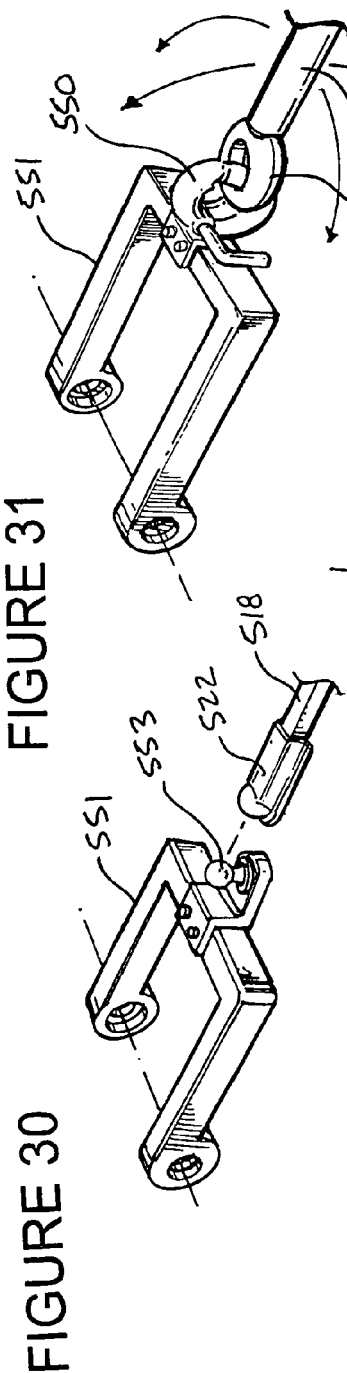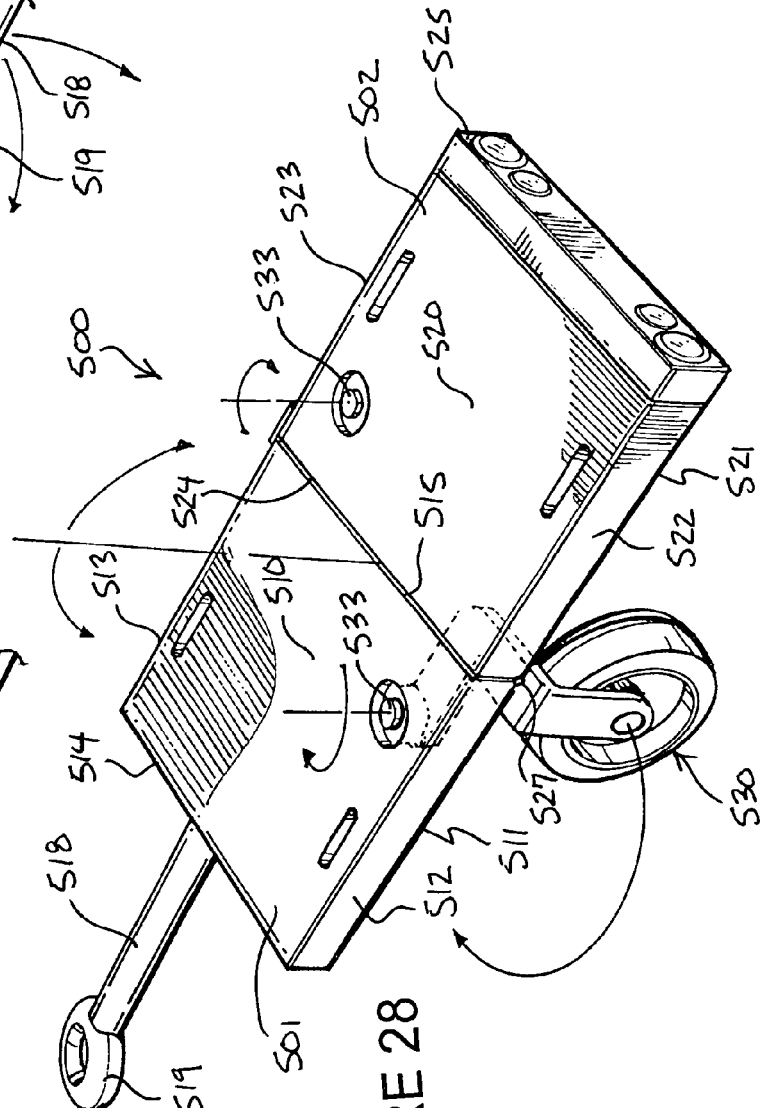
FIGURE 30
FIGURE 31
FIGURE 28

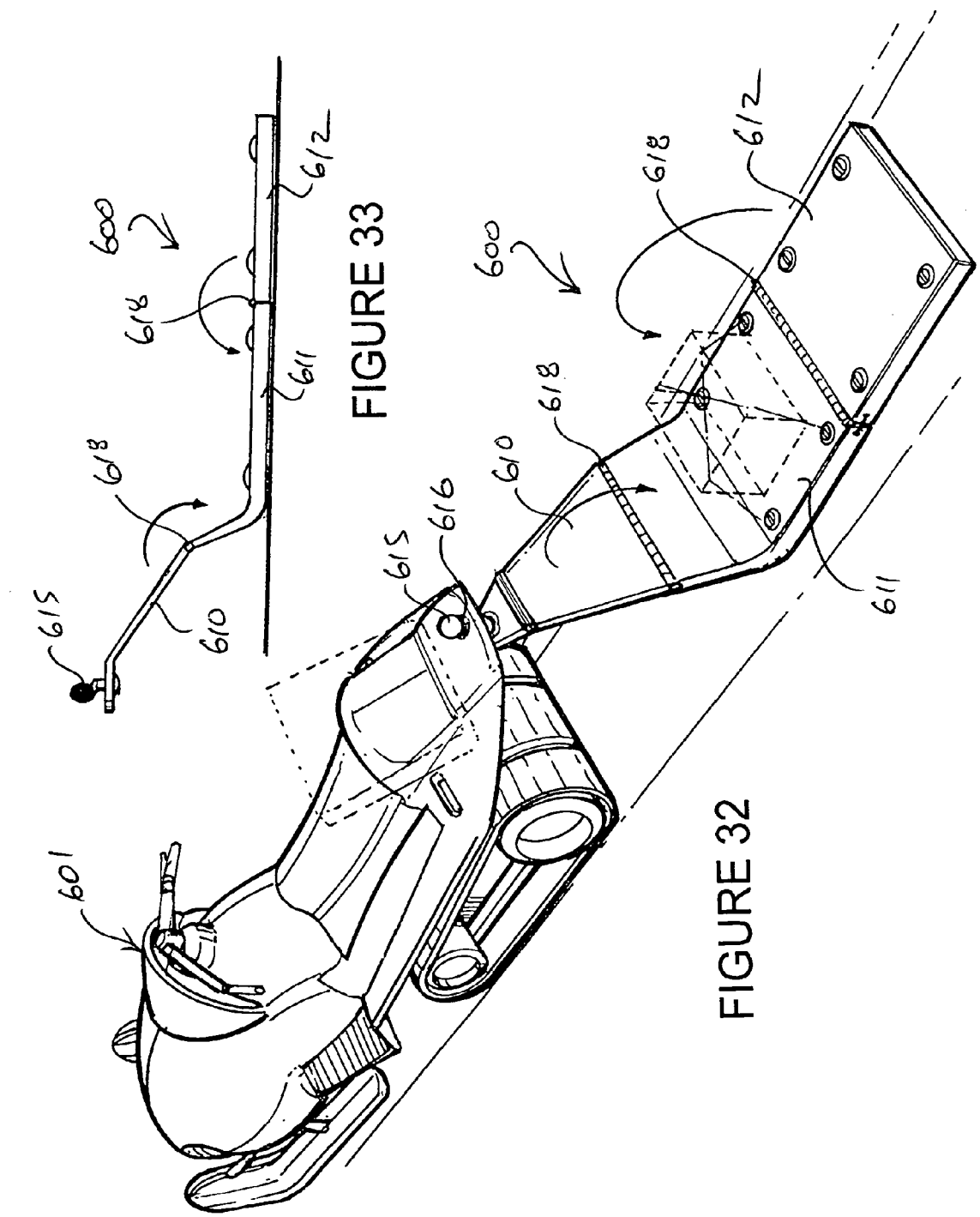

PORTABLE TRAILER

CROSS REFERENCE TO RELATED APPLICATION

This application claims the benefit of U.S. patent application Ser. No. 11/234,491, filed 23 Sep. 2005.

FIELD OF THE INVENTION

The present invention relates to trailers and, more particular, to portable trailers for use with vehicles and that are movable between stored and deployed positions relative to the vehicle.

BACKGROUND OF THE INVENTION

Transport trailers are well known and may be found in a vast array of configurations, sizes, and towing capacities. Conventional trailers are highly useful and provide an easy and efficient way to haul all types of cargo. However, most trailers are bulky and not easily stored during periods of nonuse. During periods of nonuse, trailers are often stored in rented or leased storage facilities, garages, or simply left outside, such as alongside a garage, shed, barn, or the like.

In an effort to make trailers easier to use and easier to store during periods of nonuse, skilled artisans have spent considerable effort and resources developing trailers that are actually configured to be incorporated with a vehicle, such that they may be stored relative to the vehicle during periods of nonuse and deployed relative to the vehicle for towing there behind. However, it has been noticed that known forms of deployable vehicle trailers are expensive, difficult to construct, not easily deployed for use in towing, not easily stored during periods of nonuse, bulky, and difficult to construct, all of which necessitate continued improvement in the art.

SUMMARY OF THE INVENTION

According to the principle of the invention, there is provided a transport vehicle having a rear end. A tow bat is attached to the rear end of the vehicle, and a bed is formed in the rear end of the vehicle. A base is seated on the bed, which supports a load-bearing platform at an elevated location opposing the bed forming a trailer storage space therebetween and an opening into the storage space at the rear end of the vehicle. A trailer is also provided, which includes a trailer chassis having an upstream end, a downstream end, an upper face for receiving a load, and an opposing lower face, a plurality of wheel supports attached to the trailer chassis, and a ground engaging wheel rotatably mounted to each of the wheel supports. A drawbar is attached to the trailer, which projects forwardly of the upstream end to a free end carrying a trailer hitch adapted to be hitched to the tow bat for towing the trailer chassis behind the vehicle. The trailer is positionable in a stored position consisting of the trailer in the trailer storage space with the upper face of the trailer chassis facing the load-bearing platform and the lower face of the trailer chassis facing the bed.

Each of the wheel supports includes a fixture mounted to the trailer chassis between an operative position away from the trailer chassis disposing the wheel attached thereto in a ground engaging position, and a stored position in juxtaposition with the trailer chassis disposing the wheel attached thereto in an inoperative position. A lock assembly is provided for locking the fixture in its operative position and for locking the fixture in its stored position. A bed engaging roller is mounted to the fixture engaging the bed when the trailer is placed in its stored position and the fixture is disposed in its stored position providing wheeled mobility for the trailer relative to the bed in the stored position of the trailer. A base engaging roller is mounted to the fixture for engaging the base when the trailer is placed in its stored position and the fixture is disposed in its stored position providing wheeled mobility for the trailer relative to the base in the stored position of the trailer. In another embodiment, the trailer chassis has opposing sides, and a base engaging roller is mounted to each of the opposing sides of the trailer chassis for engaging the base when the trailer is placed in its stored position for providing wheeled mobility of the trailer chassis relative to the base. A door is mounted to the vehicle for movement between an open position opening the opening to the trailer storage space and a closed position closing the opening to the trailer storage space.

Further provided is a first railing, a second railing, first engagement apparatus including a first element thereof carried by the trailer chassis adjacent the first side thereof and a first complemental element thereof carried by the first railing, and second engagement apparatus including a second element thereof carried by the trailer chassis adjacent the second side thereof and a second complemental element thereof carried by the second railing. Tail lights are attached to the rear end of the trailer chassis, and an electrical pigtail connector is operatively coupled to the tail lights.

According to the principle of the invention, there is provided a wheeled housing including a compartment formed therein and an opening formed therein leading to the compartment. The compartment is defined by opposing sidewalls of the housing, a back wall of the housing, and a floor of the housing. The wheeled housing further includes opposing forward and rearward ends, opposing sides, and a wheel mounted to each side of the wheeled housing at the forward end thereof.

Also provided is a drawbar having a proximal end and an opposing distal end having attached thereto a hitch adapted to be hitched to a tow bat. A trailer chassis has an upstream end adapted to be coupled to the proximal end of the drawbar, a downstream end, an upper face for receiving a load, and an opposing lower face. A plurality of wheel supports is attached to the trailer chassis, and a ground engaging wheel is rotatably mounted to each of the wheel supports. The trailer chassis is movable between a stored position consisting of the trailer chassis in the compartment with the upper face of the trailer chassis facing the compartment opening and the lower face of the trailer chassis facing the floor, and a deployed position withdrawn from the compartment through the opening thereof. A door is mounted to the housing for movement between an open position opening the opening to the compartment and a closed position closing the opening to the compartment enclosing therein the trailer chassis in its stored position. Tail lights are attached to the rear end of the trailer chassis, and an electrical pigtail connector operatively coupled to the tail lights.

Each of the wheel supports consists of a fixture mounted to the trailer chassis between an operative position away from the trailer chassis disposing the wheel attached thereto in a ground engaging position, and a stored position in juxtaposition with the trailer chassis disposing the wheel attached thereto in an inoperative position. A floor engaging roller is mounted to the fixture engaging the floor of the housing when the trailer chassis is placed in its stored position and the fixture is disposed in its stored position providing wheeled mobility for the trailer chassis relative to the floor in the stored position of the trailer chassis. A sidewall engaging roller is mounted to the fixture for engaging one of the sidewalls of the housing when the trailer chassis is placed in its stored position and the fixture is disposed in its stored position providing wheeled mobility for the trailer chassis relative to the one of the sidewalls of the housing in the stored position of the trailer chassis. A lock assembly is provided for locking the fixture in its operative position and for locking the fixture in its stored position. In a particular embodiment, the trailer chassis has opposing sides, and a sidewall engaging roller is mounted to each of the opposing sides of the trailer chassis for engaging the respective sidewalls of the housing when the trailer chassis is placed in its stored position for providing wheeled mobility of the trailer chassis relative to the sidewalls of the housing.

Further to the present embodiment is a first railing, a second railing, first engagement apparatus including a first element thereof carried by the trailer chassis adjacent the first side thereof and a first complemental element thereof carried by the first railing, and second engagement apparatus including a second element thereof carried by the trailer chassis adjacent the second side thereof and a second complemental element thereof carried by the second railing.

In a preferred embodiment, storage compartments are formed in the opposing sides of the housing, and the lid closes the storage compartments in its closed position and opens the storage compartments in its open position. The lid has an inner surface, padding is affixed to the inner surface, and the padding compresses against the upper face of the trailer chassis in the closed position of the lid substantially immobilizing the trailer chassis in the compartment.

Consistent with the foregoing summary of preferred embodiments of the invention, and the ensuing specification, which are to be taken together, the invention also contemplates additional embodiments as set forth herein.

BRIEF DESCRIPTION OF THE DRAWINGS

Referring to the drawings:

FIG. 6 is a top plan view of the trailer of FIG. 1;

FIG. 7 is a side elevational view of the trailer of FIG. 1, the opposing side elevational view being substantially the same thereof;

FIG. 13 is a fragmented rear elevational view of the wheel assembly of FIG. 12 shown as it would appear in an operative position with portions thereof and a trailer chassis associated therewith shown in vertical cross section for illustrative purposes;

FIG. 14 is a side elevational view of the wheel assembly as arranged in FIG. 13 shown as it would appear in its operative position;

FIG. 17 is a fragmented rear elevational view of the wheel assembly of FIG. 12 shown as it would appear in a stored position with portions thereof and a trailer chassis associated therewith shown in vertical cross section for illustrative purposes;

FIG. 18 is a top plan view of the wheel assembly as arranged in FIG. 17 shown in its stored position;

FIGS. 22 and 23 are partially schematic side elevational views of the trailer of FIG. 19 shown as it would appear in partially deployed conditions;

FIG. 24 is a view very similar to the view of FIG. 23, with the trailer shown as it would appear in a fully deployed condition;

FIG. 27 is a side elevational view of the trailer of FIG. 26;

FIG. 28 is a perspective view of yet another embodiment of a trailer constructed and arranged in accordance with the principle of the invention;

FIG. 30 is a perspective view of an embodiment of a hitch assembly for use with the trailer of FIG. 28;

FIG. 31 is a perspective view of yet another embodiment of a hitch assembly for use with the trailer of FIG. 28;

FIG. 32 is a perspective view of a sled trailer constructed and arranged in accordance with the principle of the invention, and shown as it would appear associated with a snow mobile;

FIG. 33 is a side elevational view of the sled trailer of FIG. 32; and

DETAILED DESCRIPTION OF PREFERRED EMBODIMENTS

Figure 1:
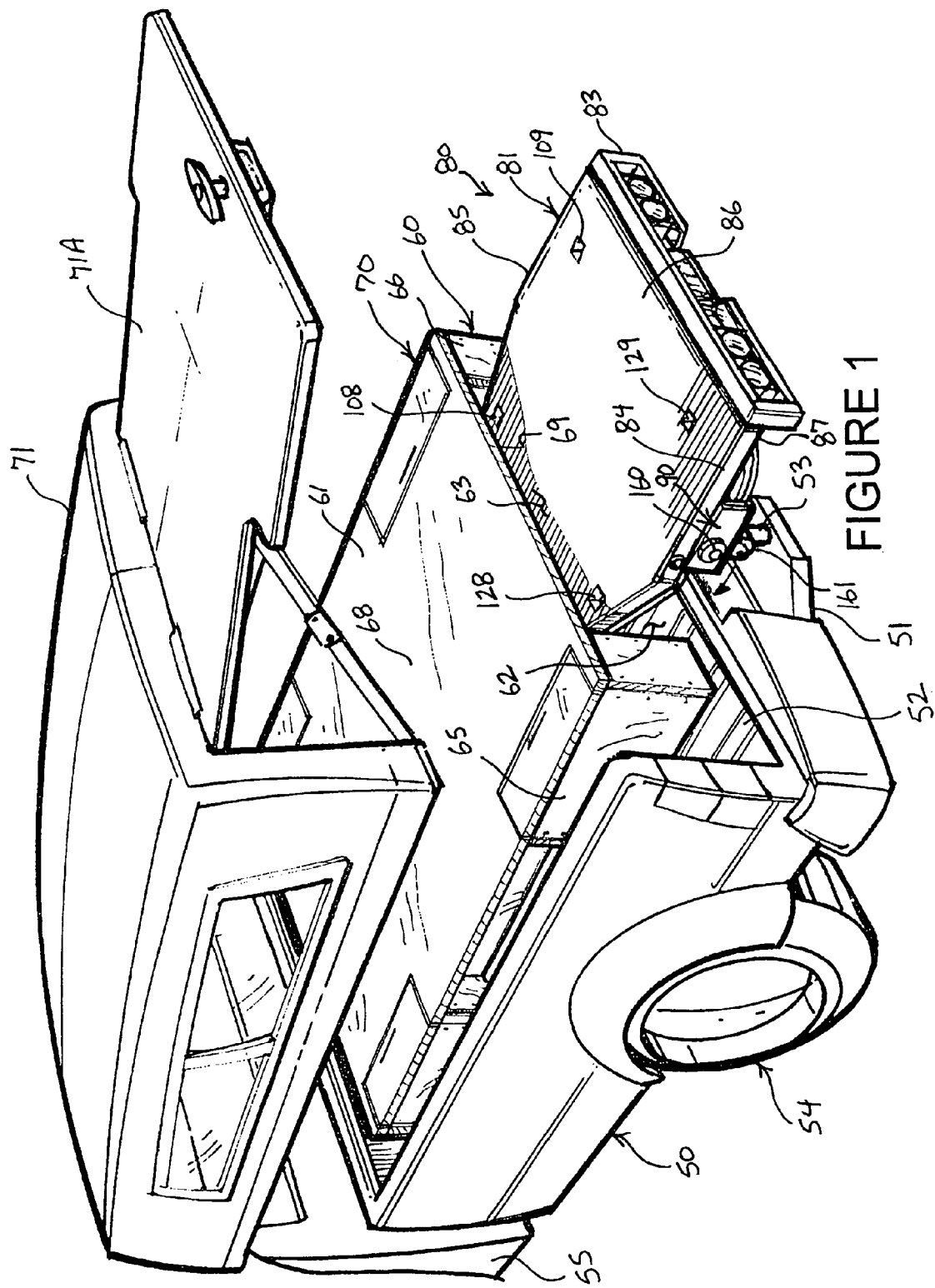
FIG. 1 is a fragmented perspective view of a transport vehicle including a bed formed in the rear end thereof, a base seated on the bed supporting a load-bearing platform at an elevated location opposing the bed forming a trailer storage space therebetween, and a trailer disposed partially in the storage space, in accordance with the principle of the invention.

Turning now to the drawings, in which like reference characters indicate corresponding elements throughout the several views, attention is first directed to FIG. 1 in which there is seen a transport vehicle 50 having a rear end 51, a bed 52 formed in rear end 51, and a tow bat 53 attached to rear end 51 of vehicle 50. Vehicle 50 is a motor vehicle and is exemplary of a conventional pickup truck including a wheeled chassis 54 that supports a cab 55 at a front end thereof and bed 52 at rear end 51 thereof.

According to the principle of the invention, a base 60 is seated on bed 52, which supports a load-bearing platform 61 at an elevated location opposing bed 52 forming a trailer storage space 62 therebetween and an opening 63 into trailer storage space 62 at rear end 51 of vehicle 50. Base 60 consists of opposed, elongate parallel support members 65 and 66 onto which platform 61 is set and rigidly secured thereto with nails, screws, nut-and-bolt assemblies, welding, a combination of two or more of the foregoing, or the like. Support members 65 and 66 are made of steel, aluminum, wood, or other substantially rigid material or combination of substantially rigid materials being strong and damage-resistant, and are each integrally formed or fashioned as an assembly is rigidly attached parts. Like support members 65 and 66, platform 61 is made of steel, aluminum, plywood, or other substantially rigid material or combination of materials being strong and capable of receiving thereon, and supporting, a load. Platform 61 is relatively large, rugged, and rectangular in shape, and for the purpose of orientation it is to be understood that platform 61 has an upper face 68 for receiving a load, and an opposing lower face 69 directed into, and in part defining, trailer storage space 62.

The combination of base 60 and platform 61 constitutes an auxiliary bed member 70, which, when positioned in bed as shown substantially in FIG. 1, occupies the majority of bed 52 blocking access to it for its normal use in taking on payload for transport. However, the provision of platform 61 takes over the function of bed 52, in which payload may be positioned on upper face 68 for transport, with the understanding the trailer storage space 62 is reserved for receiving trailer 80. For illustrative purposes only, FIG. 1 depicts a camper shell 71 positioned above bed 52 and is depicted as it would appear before being installed thereto in a normal and customary way so as to enclose a storage area above bed 52.

Trailer 80 is positionable in a stored position in storage space 62 through opening 63 for storage during periods of nonuse, and is capable of being withdrawn from storage space 62 through opening at rear end of vehicle 50 into a drawn position in preparation for towing. Trailer 80 is designed to carry a load and is, therefore, fashioned of strong, resilient materials commonly found among conventional transport trailers, which is the case with all of the trailers set forth in this disclosure.

Figure 5:
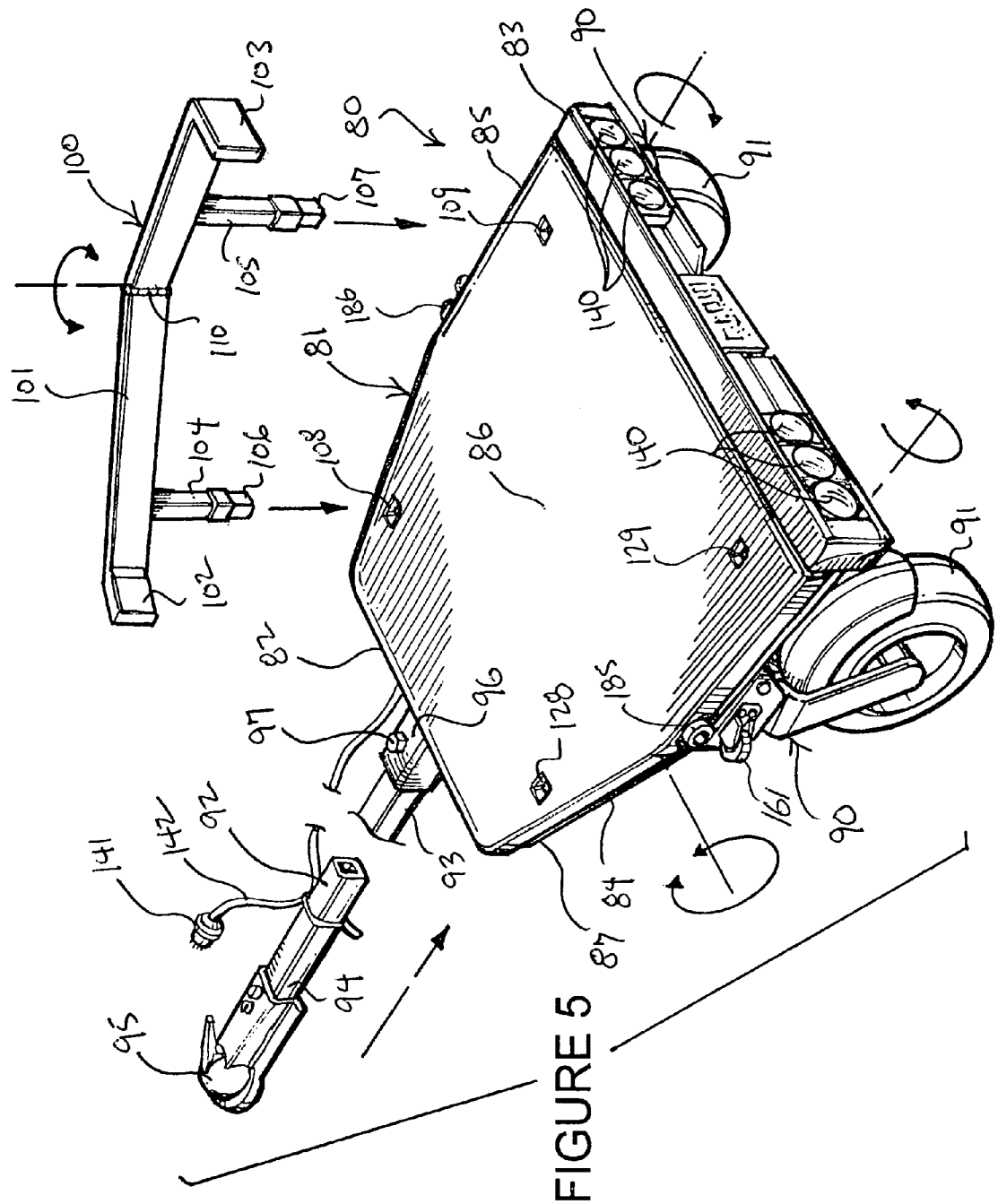
FIG. 5 is a partially exploded perspective view of the trailer of FIG. 1.

Referring to FIG. 5, trailer 80 consists of a trailer chassis 81 having an upstream end 82, an opposing downstream end 83, opposing sides 84 and 85, an upper face 86 for receiving a load, and an opposing lower face 87. A wheel assembly 90 is attached to trailer chassis 81 at each of sides 84 and 85. A ground engaging wheel 91 is rotatably mounted to each of wheel assemblies 90. Trailer 80 has an attached drawbar 92, which is elongate having a proximal end 93 coupled to trailer chassis 81 and projecting forwardly there from and from upstream end 82 to a distal or free end 94 carrying a trailer hitch 95 adapted to be hitched to tow bat 53 (FIG. 1) in a conventional manner for towing trailer 80 behind vehicle 50 (FIG. 1) In this particular embodiment, proximal end 93 is fitted into a socket 96 formed into upstream end 82 of trailer chassis 81 and is secured in place with a nut-and-bolt assembly designated at 97. After disassembling and removing nut-and-bolt assembly 97, drawbar 92 can be easily detached from trailer chassis 81 and stored during periods of nonuse. The preferred storage place for drawbar 92 is storage space 62.

With continuing reference to FIG. 5, railing 100 is provided, which consists of an elongate rail 101 including opposing forward and rearward ends 102 and 103, a front leg 104 attached to rail 101 adjacent forward end 102 and a rear leg 105 attached to rail 101 adjacent rearward end 103. Front and rear legs 104 and 105 are substantially parallel relative to one another and depend downwardly there from terminating with free ends 106 and 107, respectively, that are to be fitted into corresponding sockets 108 and 109 formed into trailer chassis 81 at side 85 through upper face 86 securing railing 100 to trailer 80, and which projects upwardly from upper face 86 of trailer 80 at side 85 for preventing payload placed onto upper face 86 from falling off side 85 of trailer 80 during use. Socket 108 is disposed toward upstream end 82 of trailer 80, and socket 109 is disposed toward downstream end 83. Rail 101 is hinged at an intermediate location between forward and rearward ends 102 and 103 with a hinge 110, which allows railing 100 to be folded into a collapsed condition for easy storage during periods of nonuse. Side 85 of trailer 80 is the right or starboard side of trailer 80. Accordingly, railing 100 is considered the right or starboard side railing for trailer 80.

The combination of free ends 106 and 107 adapted to be fitted into sockets 108 and 109, respectively, is exemplary of an engagement apparatus providing a removable engagement of railing 100 to trailer 80, in which free ends 106 and 107 together constitute an element of the engagement apparatus and sockets 108 and 109 together constitute a complemental element of the engagement apparatus. Those having regard for the art will readily appreciate that any form of engagement apparatus capable of providing a removable engagement of railing 100 to trailer 80 can be used without departing from the invention, and that the engagement apparatus set forth herein is disclosed merely as a matter of example, although it is preferred because it is easy to construct, inexpensive, and efficient.

Figure 5A:
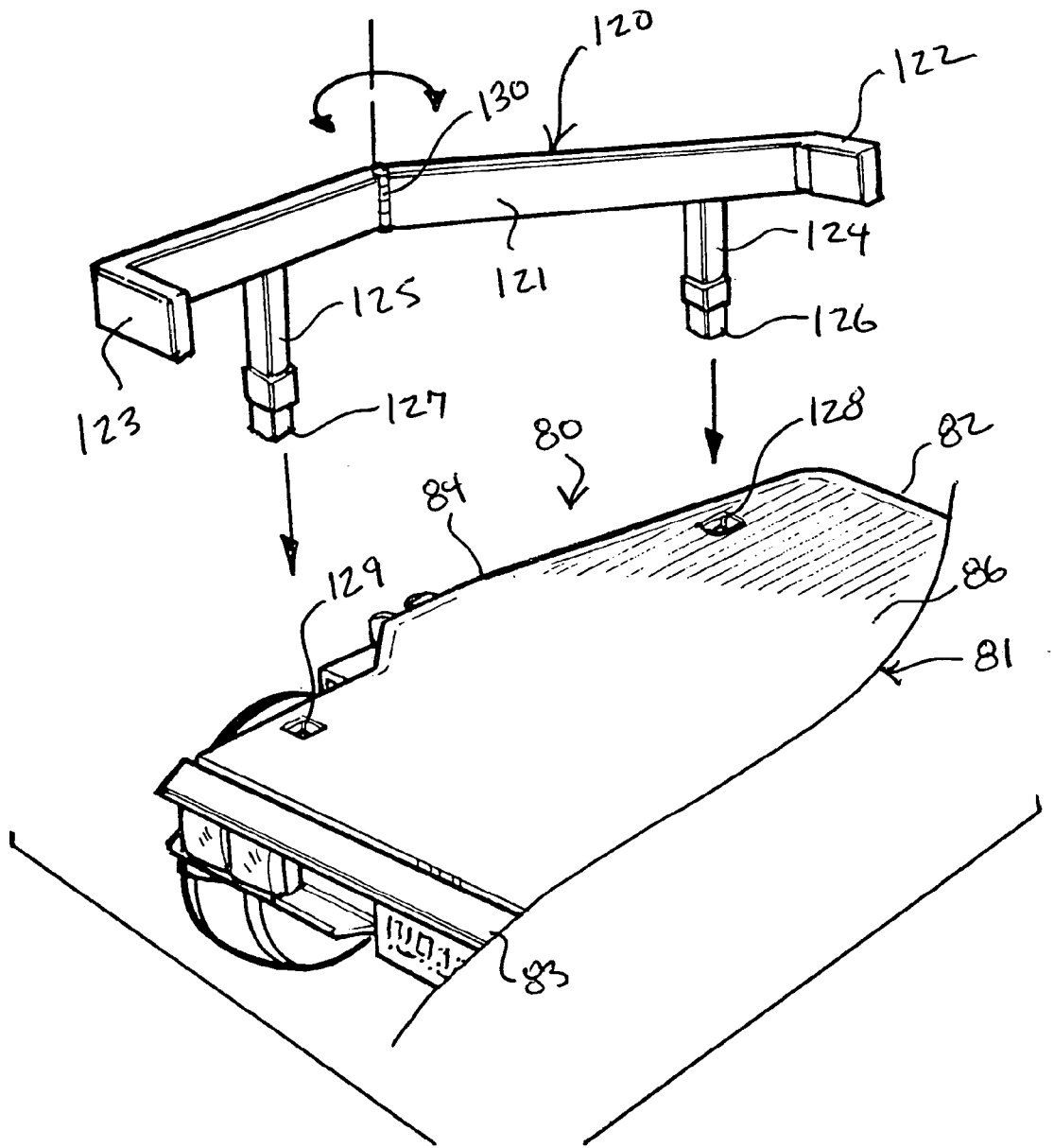
FIG. 5A is a fragmented perspective view of the trailer of FIG. 1.

Referring now to FIG. 5A there is seen another railing 120 that, in common with railing 120, consists of an elongate rail 121 including opposing forward and rearward ends 122 and 123, a front leg 124 attached to rail 121 adjacent forward end 122 and a rear leg 125 attached to rail 121 adjacent rearward end 123. Front and rear legs 124 and 125 are substantially parallel relative to one another and depend downwardly there from terminating with free ends 126 and 127, respectively, that are to be fitted into corresponding sockets 128 and 129 formed into trailer chassis 81 at side 84 through upper face 86 securing railing 120 to trailer 80, and which projects upwardly from upper face 86 of trailer at side 84 for preventing payload placed onto upper face 86 from falling off side 84 of trailer 80 during use. Socket 128 is disposed toward upstream end 82 of trailer 80, and socket 129 is disposed toward downstream end 83. Rail 121 is hinged at an intermediate location between forward and rearward ends 122 and 123 with a hinge 130, which allows railing 120 to be folded into a collapsed condition for easy storage during periods of nonuse. Side 85 of trailer 80 is the left or port side of trailer 80. Accordingly, railing 120 is considered the left or port side railing for trailer 80.

The combination of free ends 126 and 127 adapted to be fitted into sockets 128 and 129, respectively, is exemplary of an engagement apparatus providing a removable engagement of railing 120 to trailer 80, in which free ends 126 and 127 together constitute an element of the engagement apparatus and sockets 128 and 129 together constitute a complementary element of the engagement apparatus. Those having regard for the art will readily appreciate that any form of engagement apparatus capable of providing a removable engagement of railing 120 to trailer 80 can be used without departing from the invention, and that the engagement apparatus set forth herein is disclosed merely as a matter of example, although it is preferred because it is easy to construct, inexpensive, and efficient.

And so railings 100 and 120 constitute starboard and port side barriers, which together prevent cargo positioned on trailer 80 from discharging laterally of sides 85 and 84, respectively. It is to be understood that trailer 80 can be configured with additional railings or barriers for confining cargo placed on trailer 80 including, for instance, an upstream end railing/barrier at upstream end 82 and/or a downstream railing/barrier at downstream end 83.

Referring back to FIG. 5, trailer 80 incorporates tail lights 140, which are attached to downstream end 83 of trailer chassis 81 in a conventional manner. An electrical pigtail connector 141 is operatively coupled to tail lights 140 with conventional electrical wiring 142. Pigtail connector 141 is adapted to be attached to a corresponding power coupling at the rear of a vehicle for transferring braking and turn signaling from the vehicle to trailer 80.

For the purposes of disclosure and illustration, FIG. 6 is an enlarged top plan view of trailer 80, and FIG. 7 is an enlarged left side elevational view thereof, in which the opposing right side elevational view is substantially the same thereof. Also, and as previously mentioned in conjunction with FIG. 1, trailer 80 is positionable in a stored position in storage space 62 through opening 63 for storage during periods of nonuse, and may be withdrawn from storage space 62 through opening at rear end of vehicle 50 into a drawn position for preparation for towing. Drawbar 92 can be attached to trailer 80 in its stored position, or detached from trailer 80 in its stored position. It is to be understood that storage space 62 is able to accommodate trailer 80 therein in its stored position when drawbar 92 is attached thereto. In its stored position in storage space 62, upper face 86 of trailer 80 faces load-bearing platform 61, lower face 87 of trailer 80 faces bed 52, upstream end 82 of trailer 80 is directed inwardly toward the back of cap 55, and downstream end 83 of trailer 80 is disposed at rear end 51 of vehicle 50 adjacent opening 63.

Wheel assemblies 90 are identical to one another and only one will be discussed with the understanding that the ensuing discussion applies to each wheel assembly 90. Further, in the preferred embodiment set forth herein trailer 80 incorporates two wheel assemblies 90 and corresponding wheels 91 on each side of trailer 80, and less or more may be used depending on specific needs.

Figure 8:
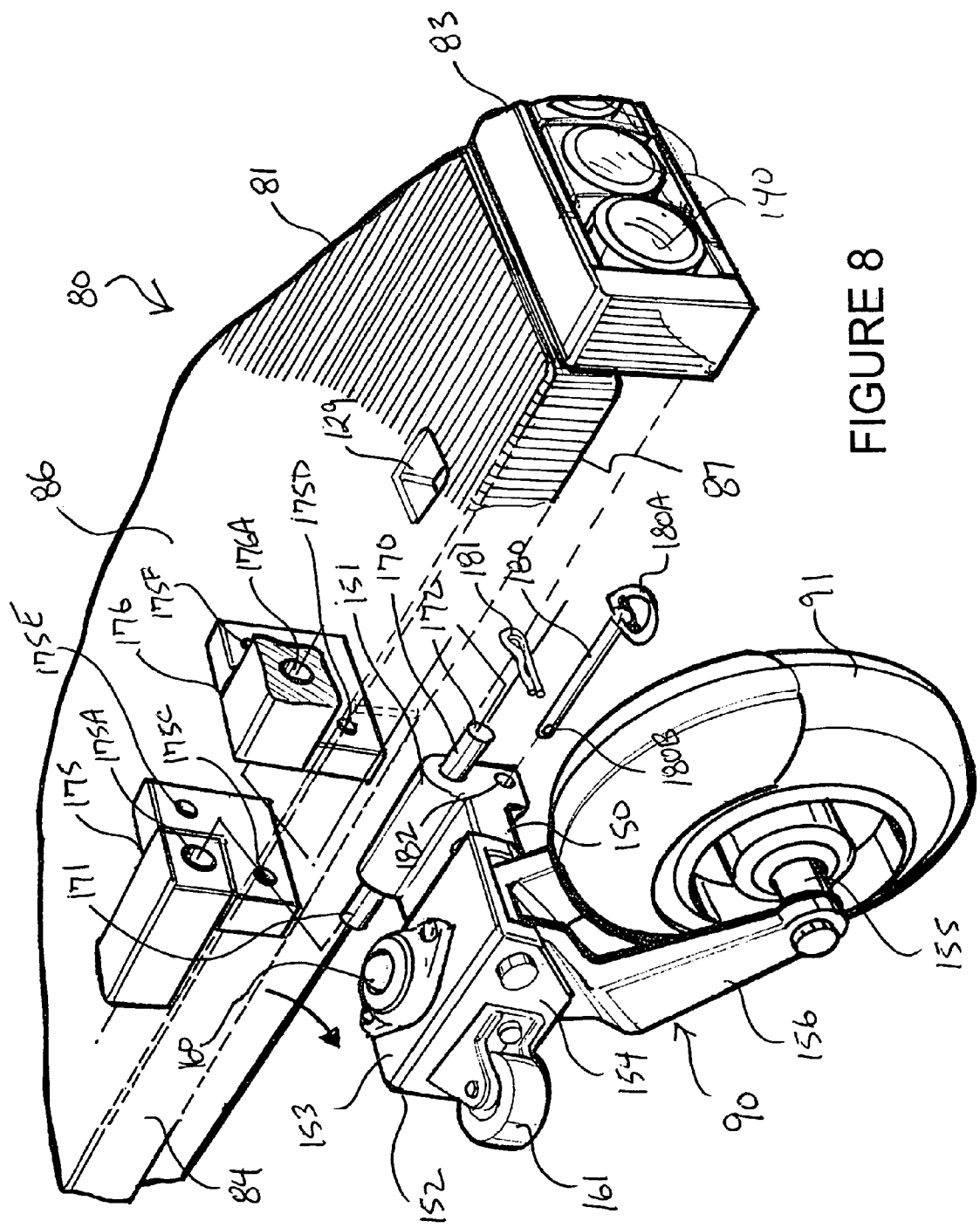
FIG. 8 is a fragmented, partially exploded perspective view of a wheel assembly of the trailer of FIG. 1.

Turning now to FIG. 8, wheel assembly 90 at side 84 of trailer 80 consists of a fixture 150 having a proximal extremity 151 and an opposing distal extremity 152 having an upper surface 153 congruent with a lateral side surface 154. A stub axle 155 is mounted to a bifurcated wheel support 156 affixed to, and depending downwardly from, distal extremity 152 of fixture 150 and to which wheel 91 is rotatably mounted in a conventional manner. A base roller 160 is affixed to upper surface 153, and a bed roller 161 is affixed to side surface 154. In this embodiment, roller 160 is considered a base roller, and roller 161 is considered a bed roller. Base roller 160 is a ball-type roller, and bed roller 161 is a caster-type roller, and this can be reversed, if desired. Base and base rollers 160 and 161 can each be provided as the same type of roller, if desired, such as a ball-type roller or a caster-type roller.

A pin 170 is carried by proximal extremity 151 of fixture 150, which is perpendicular to the central longitudinal axis of fixture 150 extending therethrough from proximal extremity 151 to distal extremity 152. Pin 170 has a front end 171 directed toward the upstream end 82 (not shown in FIG. 8) of trailer 80 and a rear end 172 directed toward downstream end 83 of trailer 80. Proximal extremity 151 is positioned between opposing supports 175 and 176 mounted to the underside of trailer chassis 81. Front and rear ends 171 and 172 are received into, opposed, corresponding bores 175A and 176A formed in supports 175 and 176, respectively, providing a pivotal mount of fixture 150 to trailer 80 between an operative position depending downwardly and away from lower face 87 of trailer 80 disposing wheel 90 in an operative or ground engaging position to be received against the ground for providing wheeled movement for trailer 80 for towing, and a stored position toward lower face 87 being in juxtaposition with trailer chassis 81 disposing wheel 91 in an inoperative position.

A locking assembly is provided for locking fixture 150 in its operative and stored position, which consists of a locking pin 180 having opposing headed and pinned ends 180A and 180B, a cotter pin 181, a through bore 182 formed through proximal end 151 of fixture 150, a first pair of opposed, corresponding bores 175C and 175D formed in supports 175 and 176, respectively, and a second pair of corresponding bores 175E and 175F formed in supports 175 and 176. Through bore 182 lies beneath, and is parallel to, pin 170. In its operative position, through bore 182 registers with bores 175C and 175D, and in its stored position through bore 182 registers with bores 175E and 175F. To secure fixture 150 in its operative position, Locking pin 180 is passed concurrently into and through bores 175C and 175D and through bore 182 therebetween and cotter pin 181 is then mounted to pinned end 180B that together with headed end 180A, each on either side of supports 175 and 176, secures locking pin 180 in place. Reversing this operation unlocks fixture 150 from its operative position. To secure fixture 150 in its stored position, locking pin 180 is passed concurrently into and through bores 175E and 175F and through bore 182 therebetween and cotter pin 181 is then mounted to pinned end 180B that together with headed end 180A, each on either side of supports 175 and 176, secures locking pin 180 in place. Reversing this operation unlocks fixture 150 from its stored position.

In the stored position of fixture 150 of wheel assembly 90 at side 84 of trailer 80, base roller 160 is directed laterally of side 84 of trailer 80, and bed roller 161 is directed downwardly away from lower face 87 of trailer 80. In the stored position of fixture 150 of wheel assembly 90 at side 85 of trailer 80, base roller 160 is directed laterally of side 85 of trailer 80, and bed roller 161 is directed downwardly away from lower face 87 of trailer 80.

Preferably, fixtures 150 of wheel assemblies 90 are each placed in the stored position in the stored position of trailer 80 depicted in FIG. 1. According to the principle of the invention, when fixtures 150 are in their stored positions bed rollers 161 engage bed 52 when trailer 80 is placed in its stored position in storage space 62 which provides easy and efficient wheeled movement and mobility of trailer 80 relative to bed 52 for permitting trailer 80 to be easily moved not only into storage space 62 through opening 63 but also out of storage space 62 from opening 63 in preparation for towing. According to the principle of the invention, when fixtures 150 are in their stored positions base rollers 160 are for engaging support members 65 and 66, respectively, of base 60 when trailer 80 is placed in its stored position in storage space 62 which provides easy and efficient wheeled movement and mobility of trailer 80 relative to base 60 reducing frictional engagement of trailer 80 against base 60 and for permitting trailer 80 to be easily moved not only into storage space 62 through opening 63 but also out of storage space 62 from opening 63 in preparation for towing.

Referring back to FIG. 5, trailer 80 shown therein incorporates opposing base rollers 185 and 186 mounted to sides 84 and 85 of trailer chassis 81. Base rollers 185 and 186 are each identical to bed roller 160 and are disposed at sides 84 and 85, respectively, each adjacent one of wheel assemblies 90. These base rollers 185 and 186 are positioned for engaging support members 65 and 66 of base 60 when trailer 80 is placed in its stored position in storage space 62 for providing additional wheeled mobility of trailer 80 relative to base 60 for providing the same function as base rollers 160. With the provision of base rollers 185 and 186, base rollers 160 carried by fixtures 150 may be altogether omitted, if desired.

Figure 2:
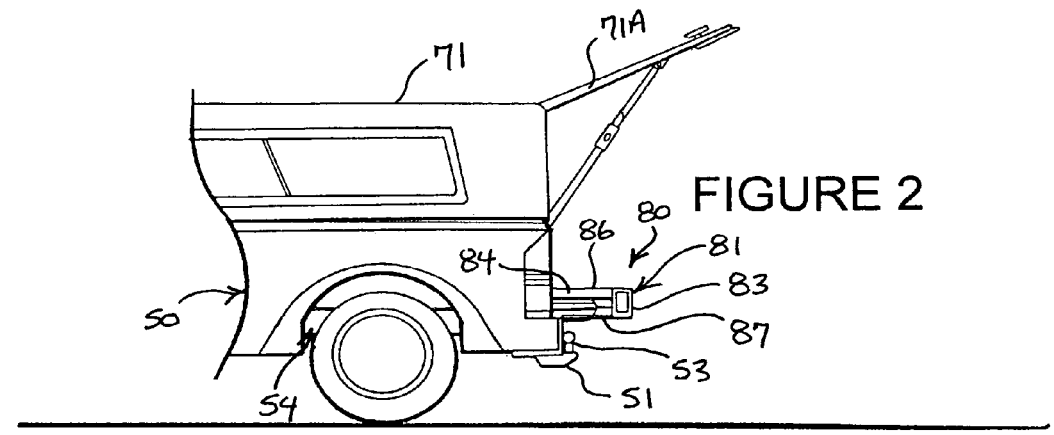
FIGS. 2-4 are fragmented side elevational views of the transport vehicle of FIG. 1 showing a sequence of deploying the trailer from the transport vehicle.
Figure 3:
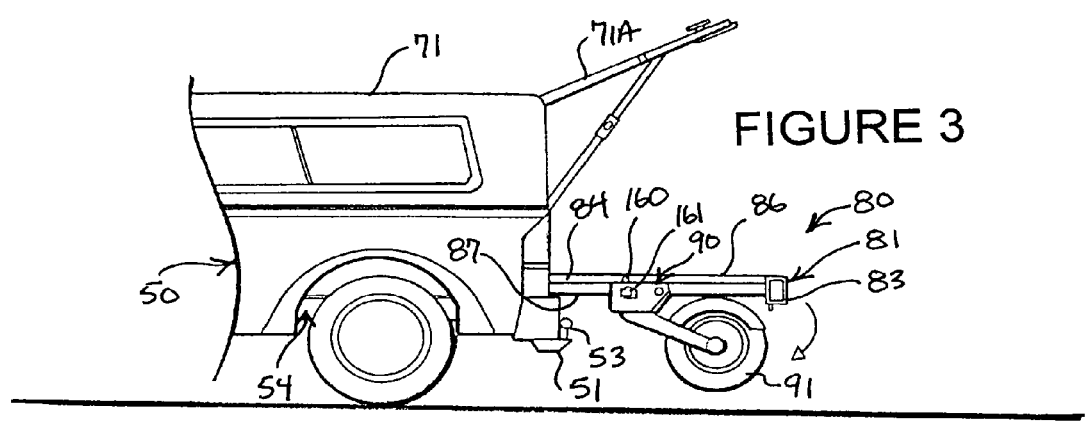
Figure 4:
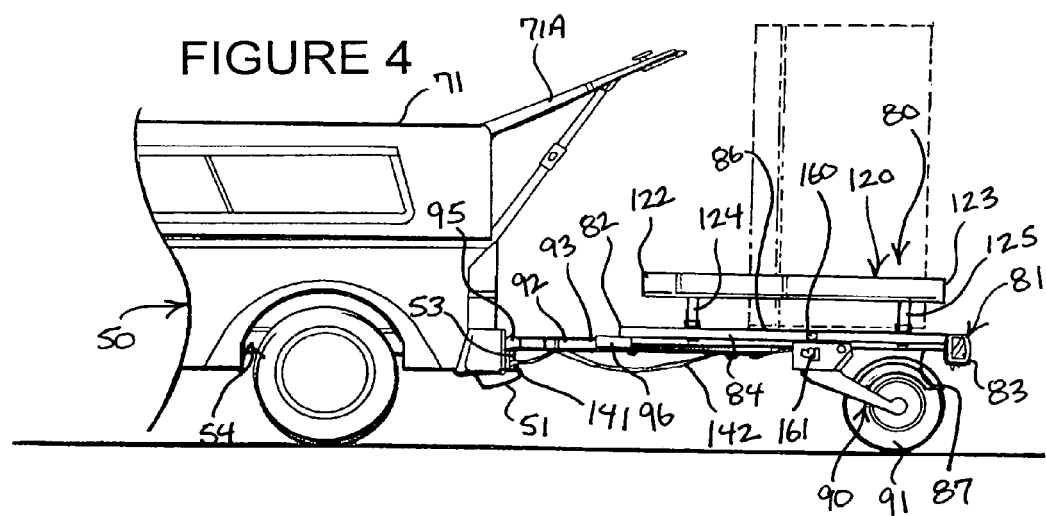

As a matter of illustration, FIGS. 2-4 show the sequence of movement of trailer 80 from its stored position to its drawn position for towing. FIG. 2 shows trailer 80 partially withdrawn from its stored position, FIG. 3 shows trailer 80 even further withdrawn from its stored position with wheel assembly 90 at side 84 trailer 80 disposed in its operative position, and FIG. 4 shows trailer 80 fully withdrawn from its stored position and hitched to vehicle 50 by the hitched engagement of hitch 95 to tow bat 53 and wheel 91 of wheel assembly 90 at side 84 of trailer engaging the ground for preparation for towing. In FIG. 4 railing 120 is shown secured in place to trailer 80, and pigtail connector 141 is plugged into a corresponding power coupling (not shown) of vehicle 50 in a conventional manner for conveying braking and turn signaling from the vehicle to trailer 80.

And so it is to be understood that auxiliary bed member 70 and trailer 80 are uniquely adapted to be used in conjunction with a pickup truck. When auxiliary bed member 70 is positioned in bed 52, storage space 62 for trailer 80 and upper face 68 of platform 61 provides a convenient load-bearing surface onto which items may be placed for transport. Trailer 80 is not only easily positioned to be stored into storage space 62 through opening 63 so that it may be easily and conveniently transported from place to place, but it is also easily and readily capable of being withdrawn from storage space 62 through opening 63 in a drawn position for towing, in which wheel assemblies 90 are easily adjusted to their stored position for storing trailer 80 in storage space 62 and also easily adjusted into their operative positions for preparation for towing trailer 80 behind vehicle 50 should the need for towing a selected payload arise. Railings 100 and 120 may be easily secured in place to trailer 80 for preventing payload positioned on upper face 86 of trailer from falling off the sides of trailer 80, and payload positioned on upper face 86 may be conveniently tied for securing payload in place. Railings 100 and 120 are hinged so that they be detached from trailer 80 and folded compactly for easy storage, such as in storage space 62 or elsewhere.

Vehicle 50 may be equipped with a gate or door that may be used for closing opening 63 to storage space 62 for preventing trailer 80 from discharging from storage space 62 from its stored position when vehicle 50 is being driven. This can be provided by a conventional tailgate mounted to rear end 51 of vehicle 50 or a different door or gate, such as door 71A of camper shell 71, which is mounted in place for pivotal movement between a raised or open position and a lowered or closed position. Referring generally to FIGS. 1-4, it is to be understood that when camper shell 71 is secured to vehicle 50 at rear end 51 of vehicle 50 overlying the bed, that door 71A is pivots between an open position opening the opening 63 to storage space 62 and a closed position closing the opening 63 to storage space 62. Storage space 62 and opening 63 are not shown in FIGS. 2-4.

Figures 9, 10, 11:
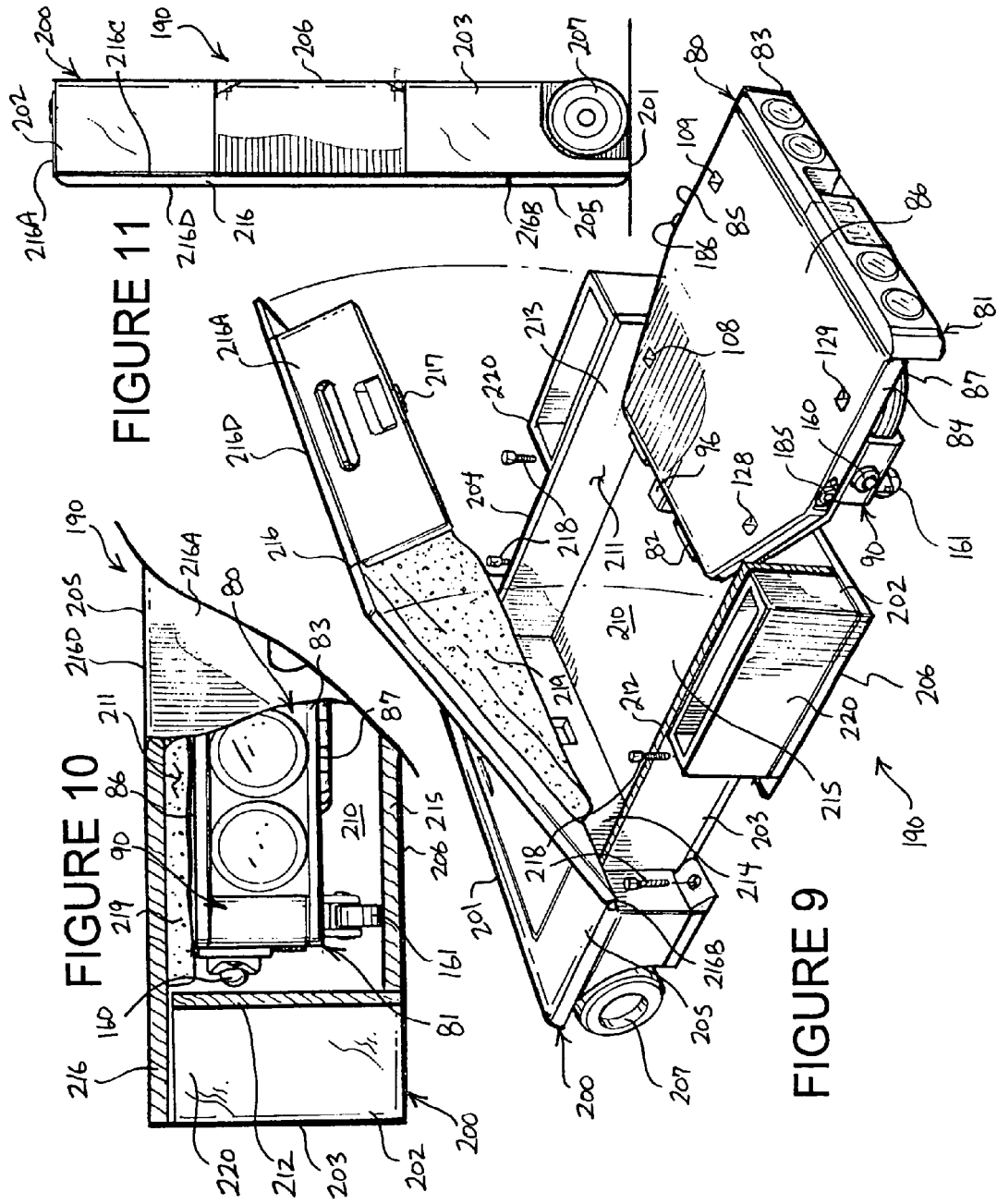
FIG. 9 is a perspective view of a portable trailer assembly shown with a trailer thereof depicted as it would appear partially withdrawn from a housing with a lid thereof shown as it would appear in an open position, in accordance with the principle of the invention.
FIG. 10 is a fragmented vertical sectional view of the housing of FIG. 9 with the lid shown as it would appear in a closed position enclosing the trailer in the housing.
FIG. 11 is an upright side elevational view of the housing of FIG. 9.

Referring now to FIG. 9 there is seen a perspective view of a further exemplary embodiment of the invention, that being a portable trailer assembly 190 including a transport housing 200 and trailer 80. In accordance with the principle of the invention, housing 200 is a wheeled housing and includes opposing ends 201 and 202, opposing sides 203 and 204, a top 205 and an opposing bottom 206. In the interests of orientation and reference, it is to be understood that end 201 is considered a forward end of housing 200, end 202 is considered a rearward end of housing 200, side 203 is considered the left or port side of housing 200, and side 204 is considered the right or starboard side of housing 200. A wheel 207 (only one shown) is mounted conventionally for rotation to each side 203 and 204 of housing 200 at forward end 201 thereof, in which housing 200 may be tipped up at its rearward end 202 and rolled from place to place for easy, rolled transport of housing 200 and trailer 80 maintained therein. Housing 200 is preferably made of aluminum, wood, hard plastic, or other substantially rigid material or combination of substantially rigid materials being strong and damage-resistant.

A compartment 210 is formed in housing 200 as is an opening 211 leading thereto. Compartment 210 is defined by opposing upstanding sidewalls 212 and 213 of housing 200, a corresponding upstanding back wall 214 of housing 200, and a large, flat, horizontal floor 215 of housing 200. Sidewall 212 is located at side 213 of housing 200, sidewall 213 is located at side 214 of housing 200, and back wall 214 is located between ends 211 and 212 and more toward end 211 than end 212 as clearly shown in FIG. 9. Top 205 is formed with a lid 216 having a distal end 216A and an opposing proximal end 216B mounted to housing 200 for pivotal movement with one or more conventional hinges between an open position of lid 216 as shown in FIG. 9 away from compartment 210 opening the opening 211 to compartment 200 and a closed position of lid 216 toward compartment 210 closing the opening 211 to compartment 200 and enclosing compartment 210. FIG. 11 is an upright side elevational view of housing 200 shown as it would appear with lid 216 in its closed or shut position and in preparation for wheeled movement.

Trailer 80 is positionable in a stored position in compartment 210 through opening 211 for storage in housing 200 during periods of nonuse, and may be withdrawn from compartment 210 through opening 211 of housing 200 into a drawn position for preparation for towing. In its stored position in compartment 210, upper face 86 of trailer 80 faces lid 21, lower face 87 of trailer 80 faces floor 215, upstream end 82 of trailer 80 is directed inwardly toward back wall 214 of housing 200, downstream end 83 of trailer 80 is disposed at end 202 of housing 200, side 84 of trailer 80 is directed toward side wall 212, and side 85 of trailer 80 is directed toward side wall 214. When trailer 80 is stored in housing 200, lid 216 is preferably moved into its closed position closing opening 211 and enclosing compartment 210 and trailer 80 positioned therein. Distal end 216A of lid 216 preferably incorporates a conventional latch 217 (FIG. 9), which is used to secure lid 216 in its closed position and which then may be conveniently unlatched for opening lid 216 to gain access to trailer 80 positioned in housing 200. Latch 217 is the type commonly found incorporated with pickup truck tailgates in a preferred embodiment, although any suitable latch form may be used without departing from the invention.

Lid 216 has an inner surface 216C directed toward compartment 210, and an opposing outer surface 216D. Padding 219, which is preferably foam padding, is affixed to inner surface 216C, such as with adhesive, screws, rivets, etc. According to the invention, padding 219 compresses against upper face 86 of trailer 80 in the closed position of lid 216 as shown in FIG. 10. This substantially immobilizes trailer 80 in compartment 210 thereby substantially preventing it from shifting in compartment 210.

Preferably, wheel assemblies 90 of trailer 80 are placed in their stored positions in the stored position of trailer 80 in compartment 210 so that rollers 161 engage floor 215 when trailer 80 is placed in its stored position in compartment 210 which provides easy and efficient wheeled movement and mobility of trailer 80 relative to floor 215 for permitting trailer 80 to be easily moved not only into compartment 210 through opening 211 when lid 216 is opened but also out of compartment 210 through opening 211 in preparation for towing. When trailer 80 is used in conjunction with housing 200, rollers 161 are considered floor rollers. In FIG. 9, draw bar 92 is not shown attached to socket 96, which is preferred for the storage of trailer 80 in compartment 210. Draw bar 92 can be placed in compartment 210 and stored therein accompanying trailer 80 when stored therein. After withdrawing trailer 80 from housing 200 in preparation for towing, it is to be understood that draw bar 92 is to be attached to socket 96 for preparing trailer 80 for towing. Compartment 210 may be sized or accommodating trailer 80 in its stored position with draw bar 92 attached thereto.

According to the principle of the invention, when wheel assemblies 90 are in their stored positions rollers 160 are for engaging sidewalls 212 and 213, respectively, of housing 200 when trailer 80 is placed in its stored position in compartment 210, which provides easy and efficient wheeled movement and mobility of trailer 80 relative to sidewalls 212 and 213 reducing frictional engagement of trailer 80 against sidewalls 212 and 213 and for permitting trailer 80 to be easily moved not only into compartment 210 through opening 211 but also out of compartment 210 through opening 211 in preparation for towing. When trailer 80 is used in conjunction with housing 200, rollers 160 are considered sidewall rollers.

Rollers 185 and 186 of trailer 80 (FIG. 9) are positioned for engaging sidewalls 212 and 213 of housing 200 when trailer 80 is placed in its stored position in compartment 210 for providing additional wheeled mobility of trailer 80 relative to sidewalls 212 and 213 of housing 200 for providing the same function as rollers 160. With the provision of rollers 185 and 186, rollers 160 may be altogether omitted, if desired.

Housing 200 is thus the mechanism for storing trailer 80, and because it is wheeled with wheels 207 it is easily taken up and rolled from place to place as needed. Housing 200 may be placed into a vehicle for transport from place to place, in which trailer 80 may be removed from housing 200 as the need arises for towing and then placed back in housing 200 for storage after use. Preferably, housing 200 is designed to be placed onto the bed of a pickup, such as bed 52 previously discussed. Preferably, housing 200 is placed onto a bed of a pickup so that lid 216 faces up and is directed rearwardly so that it may be readily accessed for opening housing 200 to access compartment 210 and trailer 80 housed therein. When placed into the bed of a pickup, cargo may be placed onto top 205 of housing 200 for transport. After placing housing 200 into the bed of a pickup, it may, if desired, be secured in place to the bed, such as with screws 218 (FIG. 9) or the like, such that end 202 is directed rearwardly or otherwise downstream for convenient access to lid 216 and to trailer 80 located in housing 200.

To increase the utility of housing 200, storage compartments 220 are formed in sides 203 and 204 of housing 200, which may be used for storing any number of selected items, such as food, tools, flashlights, first-aid kits, fishing gear, ammunition, camping equipment, etc. Lid 216 closes storage compartments 220 in its closed position and opens storage compartments 220 in its open position. Although housing 200 incorporates two storage compartments 220, it may be configured with less or more.

Figure 12:
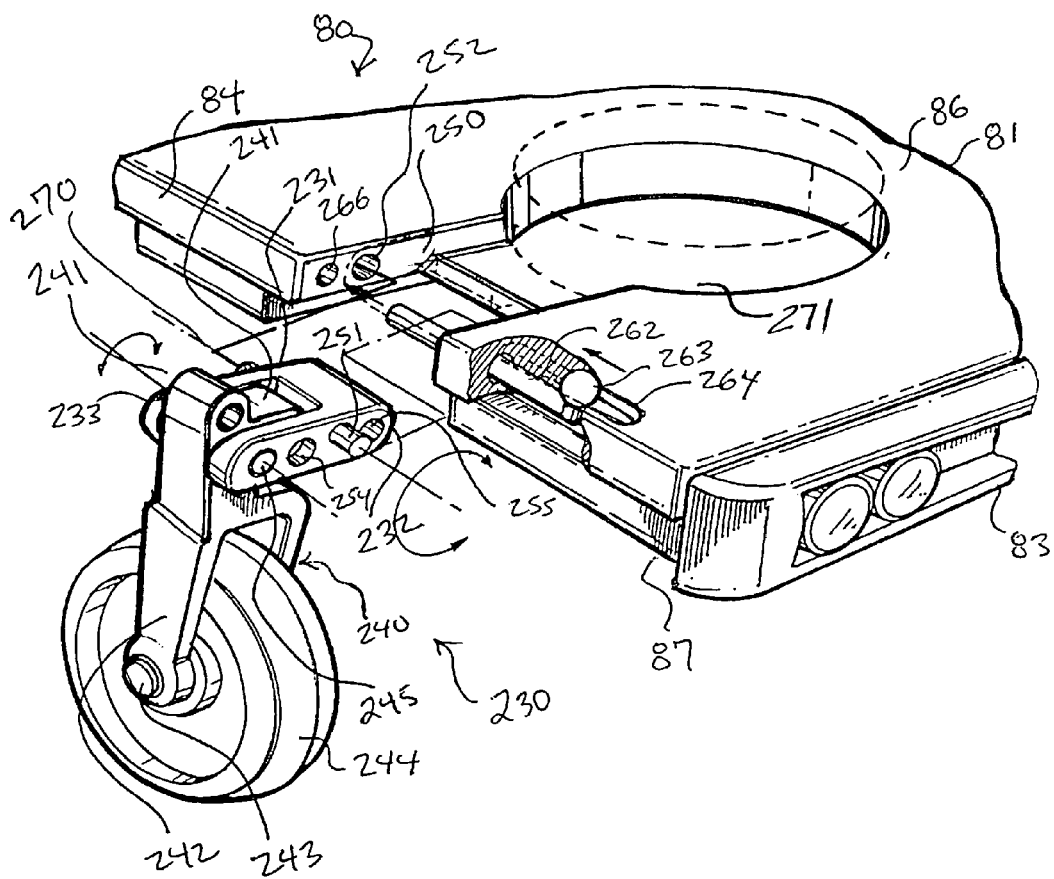
FIG. 12 is an alternate embodiment of a wheel assembly for use with a trailer constructed and arranged in accordance with the principle of the invention.

Wheel assembly 90 is preferred for trailer 80 insofar as each is easy to construct, efficient, and easily movable between stored and deployed positions. FIG. 12 is an alternate embodiment of a wheel assembly 230 for use with a trailer constructed and arranged in accordance with the principle of the invention and is discussed in conjunction with side 84 of trailer 80, with the understanding that the ensuing discussion also applies to such a wheel assembly incorporated with side 85 of trailer 80.

Wheel assembly 230 consists of a fixture 231, having a proximal end 232 and an opposing bifurcated distal end 233. There is also a wheel support 240 having an upper end 241 and an opposing lower end 242, and which is positioned in bifurcated distal extremity 233 and mounted for pivotal movement thereto at a location therebetween upper end 241 and lower end 242 with a pivot pin 245. Lower end 242 is a bifurcated wheel support to which is mounted a stub axle 243. A wheel 244 is rotatably mounted to stub axle 243 in a conventional manner. Wheel assembly 230 is movable between an operative position with lower end 242 depending downwardly and away from lower face 87 of trailer 80 disposing wheel 244 in an operative or ground engaging position to be received against the ground for providing wheeled movement for trailer 80 for towing, and a stored position in juxtaposition with upper face 86 of trailer 80 disposing wheel 244 in an inoperative position. A locking assembly is provided for locking wheel assembly 230 in its operative and stored position.

A receiving area 250 is formed in side 84 of trailer 80. Fixture 231 is positioned in receiving area 250, and is mounted for pivotal movement to trailer 80 with a pivot pin 251 secured to fixture 231 and which extends transversely of fixture 231 at a generally intermediate location between proximal and distal ends 232 and 233, and which is received in a bore 252 formed in trailer 80 at either side of receiving area 250. Opposed, parallel through bores 254 and 255 extend through fixture 231 on either side of pivot pin 251. Through bore 254 is disposed between pivot pins 245 and 251. Pivot pins 245 and 251 and through bores 254 and 255 are parallel relative to one another and perpendicular to the central longitudinal axis of fixture 231 extending therethrough from proximal end 232 to distal end 233.

Fixture 231 is mounted for pivotal movement at pivot pin 251 between a deployed position and a stored position. In the deployed position of fixture 231, distal end 233 is directed outwardly of trailer 80 and proximal end 232 is directed inwardly of trailer 80, and this is shown in FIG. 13. In the stored position of fixture 231, distal end 233 is directed inwardly of trailer 80 and proximal end 232 is directed outwardly of trailer 80, and this is shown in FIG. 17.

Figure 15:
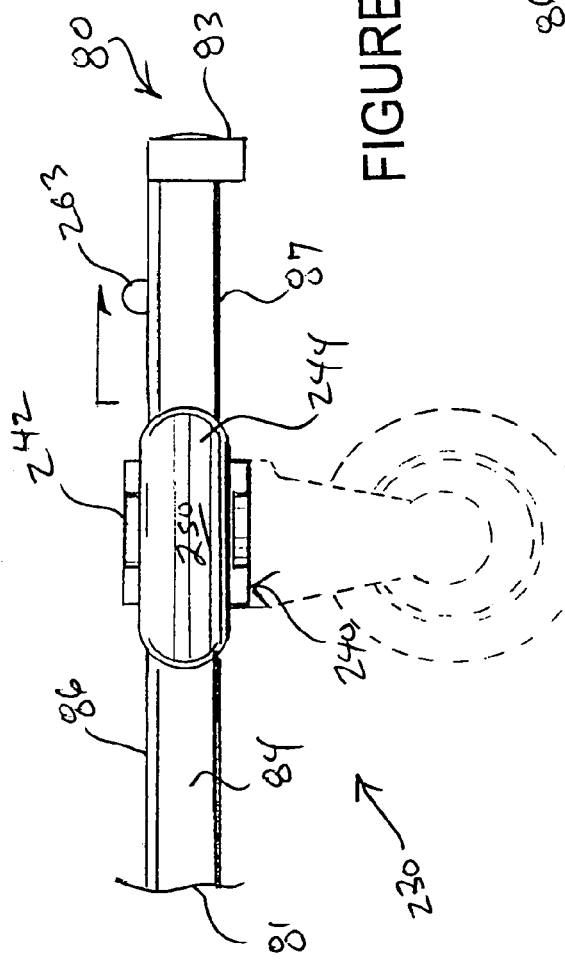
FIG. 15 is a side elevational view of the wheel assembly of FIG. 12 shown as it would appear in a partially stored position.
Figure 16:
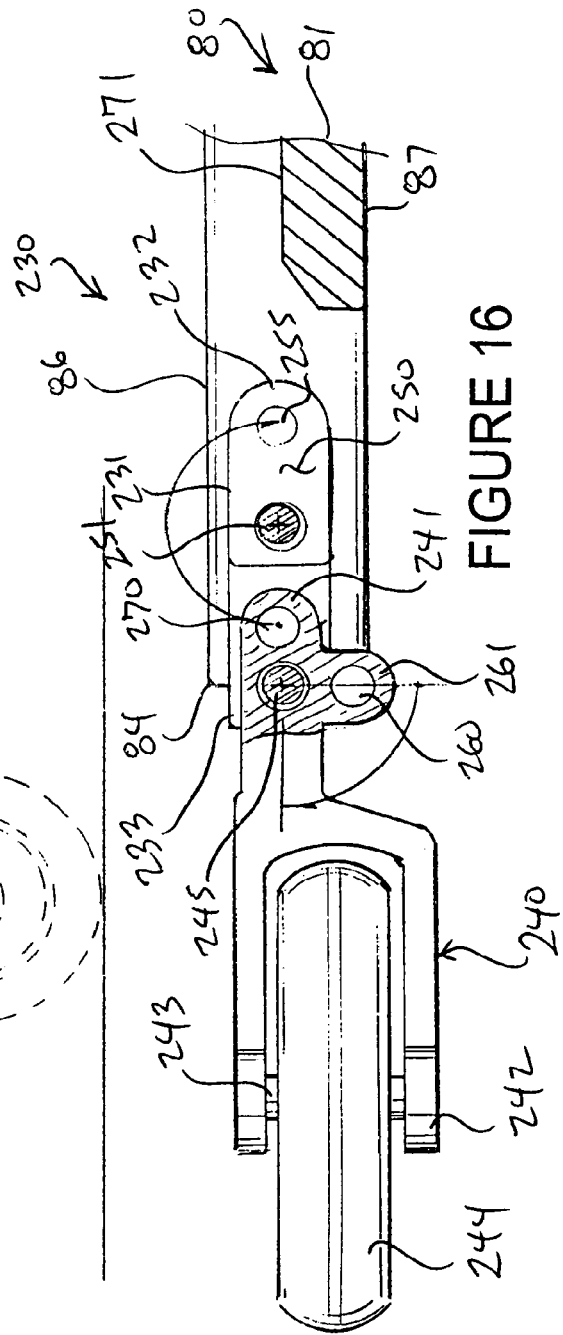
FIG. 16 is a fragmented rear elevational view of the wheel assembly as arranged in FIG. 12 shown as it would appear in the partially stored position with portions thereof and a trailer chassis associated therewith shown in vertical cross section for illustrative purposes.

In the deployed position of fixture 231, wheel support 240 may be placed in one of two different positions relative to fixture 231, namely, a deployed position as shown in FIG. 13 and 14 placing wheel 24 in a ground engaging position for towing, and a stored position as shown in FIGS. 15 and 16. In the deployed positions of fixture 231 and wheel support 240 as shown in FIG. 13, wheel assembly 230 is, as a whole, deployed or otherwise disposed in a deployed or operative position, in which wheel 244 is disposed in its operative or ground engaging position for towing relative to trailer 80. In the stored positions of fixture 231 and wheel support 240 as shown in FIG. 17, wheel assembly 230 is, as a whole, stored or otherwise disposed in a stored or inoperative position, in which wheel assembly 230 is collapsed relative to trailer 80.

In the deployed positions of fixture 231 and wheel support 240 as shown in FIG. 13, wheel support 240 is perpendicular relative to fixture 231, and a through bore 260 extending through an appendage 261 of wheel support 240 formed laterally inward of pivot pin 245 registers with bore 254 through fixture 231. The locking assembly for wheel assembly 230 includes a locking pin 262 and a pin-receiving bore 266. Locking pin 262 is mounted to trailer chassis 81 at side 84 for reciprocal movement in opposition to fixture 231 from a downstream location of receiving area 250 relative to fixture 231. Locking pin 262 registers with bores 260 and 254 in the deployed positions of fixture 231 and wheel support 240. To lock wheel assembly 230 in its deployed position, locking pin 262 is passed concurrently into and through bores 260 and 254 and into pin-receiving bore 266 formed in trailer chassis 81 at an upstream location of receiving area 250 thereby locking wheel assembly 230 in its deployed position. Reversing this operation unlocks wheel assembly 230 from its deployed position.

A handle 263 is attached to locking pin 262, which extends outboard of upper face 86 of trailer 80 through an elongate groove 264 (FIGS. 12 and 18) formed through upper face 86 of trailer 80. Handle 263 is used to reciprocate locking pin 262 between its locked and unlocked positions.

To move wheel assembly 230 from its deployed position to its stored position, wheel support 240 is pivoted 90 degrees upwardly relative to fixture 231 in its deployed position so that a through bore 270 formed through upper end 241 of wheel support 240 registers with through bore 254 through fixture 231, in which locking pin 262 registers therewith and may be passed concurrently through bores 270 and 254 and into pin-receiving bore 266 locking wheel support 240 in place in its stored position relative to fixture 231. Rather than moving locking pin 262 concurrently into and through bores 270 and 254 locking wheel support 240 in what is considered its stored position relative to fixture 231, fixture 231 and wheel support 240 may be together pivoted upwardly at pivot pin 251 into the stored position of fixture 230 as shown in FIGS. 17 and 18 placing the wheel support and wheel 244 of wheel support 240 in a recess 271 formed in upper surface 86 of trailer 80, which places wheel assembly 230 as a whole into its stored position. In the stored position of wheel assembly 230, through bore 255 through proximal end 232 of fixture 231 registers with locking pin 262, in which locking pin 262 may be moved through bore 270 and into pin-receiving bore 266 thereby locking wheel assembly 230 in its stored position for storing trailer 80 during periods of nonuse, either in storage space 62 in conjunction with the embodiment discussed in conjunction with FIG. 1, or in compartment 210 of housing 200 discussed in conjunction with FIG. 9. Reversing this operation unlocks wheel assembly 230 from its stored position and allows it to be moved back into its deployed position in preparation for towing.

Figures 19, 20:
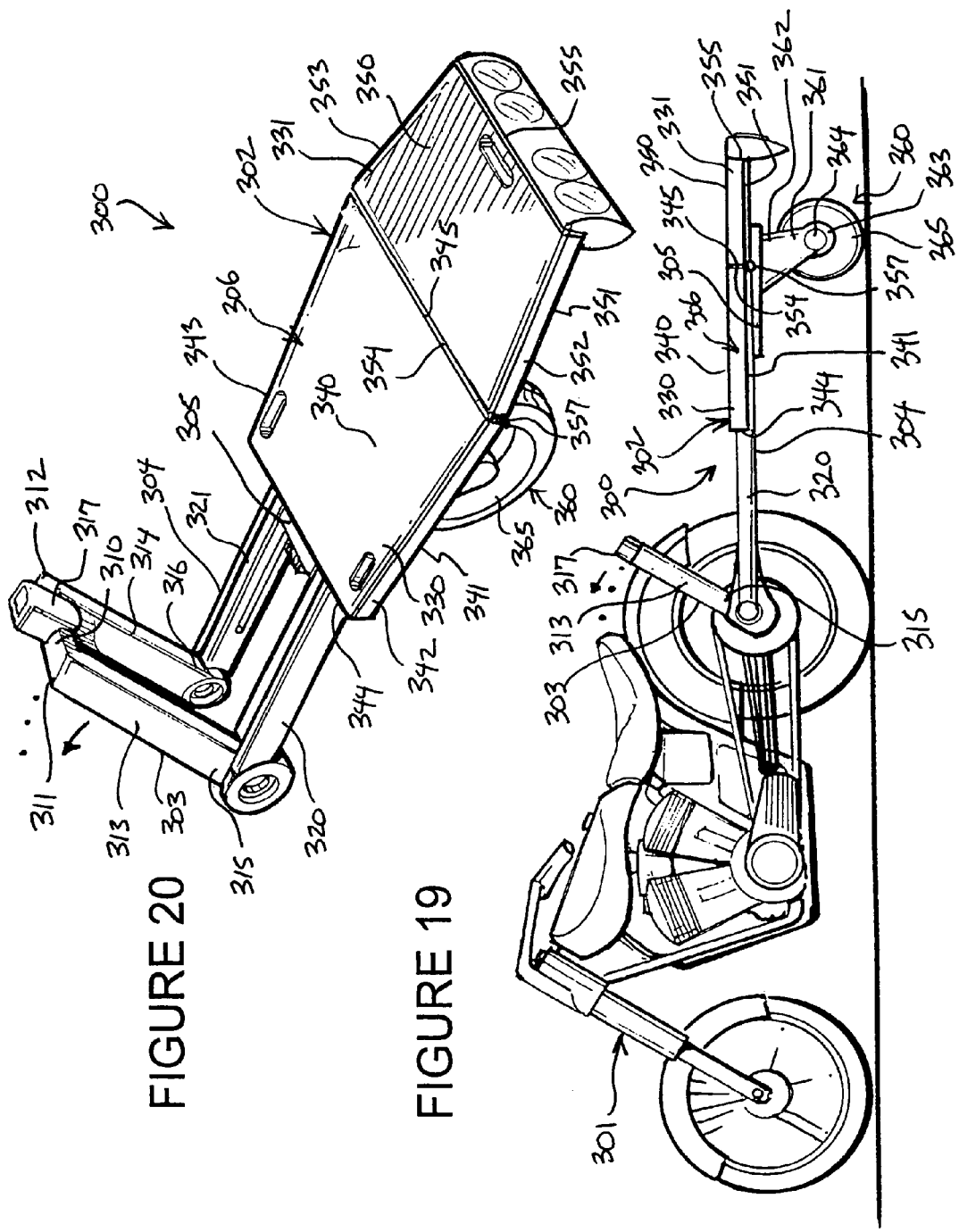
FIG. 19 is a side elevational view of a trailer constructed and arranged in accordance with the principle of the invention, and shown as it would appear incorporated with a motorcycle.
FIG. 20 is a perspective view of the trailer of FIG. 19.

Referring now to FIG. 19 there is seen a side elevational view of another embodiment of a trailer 300 constructed and arranged in accordance with the principle of the invention, and shown as it would appear incorporated with a motorcycle 301. Looking to FIG. 20, trailer 300 consists of a trailer chassis 302 including a brace 303, a framework 304, a carriage 305, and a trailer platform assembly 306. Brace 302 consists of an inverted, generally U-shaped support including an elongate, transverse support 310 having opposing ends 311 and 312. Opposed, parallel supports 313 and 314 depend downwardly from ends 311 and 312 and terminate with lower ends 315 and 316, respectively. Transverse support 310 incorporates a socket 317 disposed at a generally intermediate location between ends 311 and 312.

Figure 25:
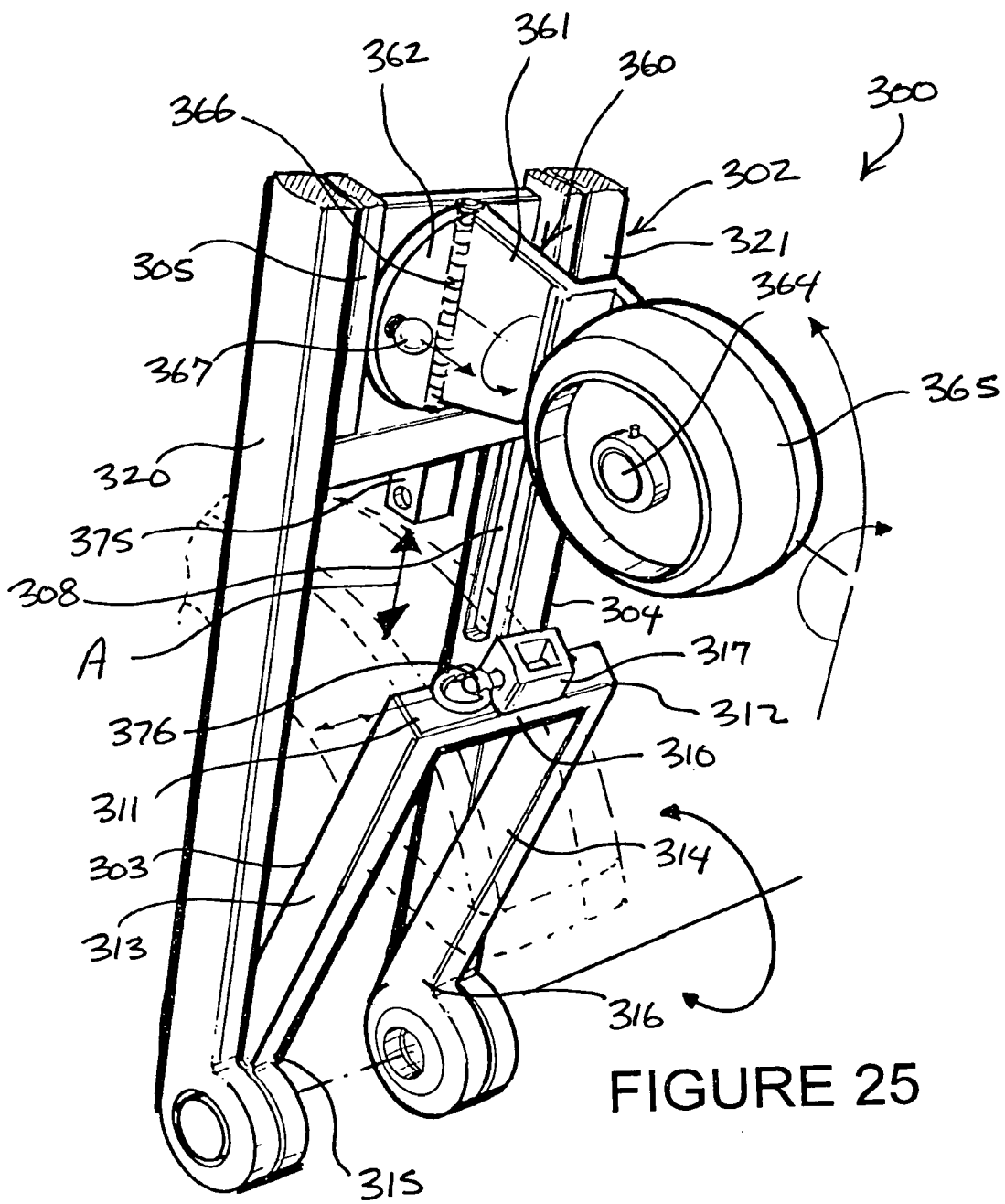
FIG. 25 is a fragmented perspective view of a trailer chassis of the trailer of FIG. 19.

Framework 304 includes opposed parallel rails 320 and 321 mounted for pivotal movement to, and projecting forwardly of, lower ends 315 and 316 of brace 303. Looking momentarily to FIG. 25, carriage 305 is positioned between rails 320 and 321 and is mounted thereto for movement in reciprocal directions relative to lower ends 315 and 316 of brace 303 as indicated by the double arrowed line A between a retracted position toward brace 303 and an extended position away from brace 303. Preferably, the sides of carriage 305 are mounted into opposed, corresponding grooves for reciprocal movement, which are formed into inner sides of rails 320 and 321, respectively. In FIG. 25, a groove 308 formed into the inner side of rail 321 is shown, into which is received the side of carriage 305. Rail 320 is provided with the same manner of groove into which is received the opposing side of carriage 305. Carriage 305 may be mounted to rails 320 and 321 for reciprocal movement using other forms of reciprocal attachment mechanisms.

As best seen in FIG. 20, platform assembly 306 includes opposed upstream and downstream platforms 330 and 331, and is positioned atop framework 304 and carriage 305. Upstream platform 330 is flat and includes an upper face 340, and an opposing lower face 341 rigidly affixed to rails 320 and 321 with screws, nut-and-bolt assemblies, or the like. Upstream platform 330 also includes opposing sides 342 and 343, an upstream end 344 directed toward brace 303, and an opposing downstream end 345. Downstream platform 331 is flat and includes opposing upper and lower faces 350 and 351, opposing sides 352 and 353, an upstream end 354 directed toward downstream end 345 of upstream platform 330, and an opposing downstream end 355. Sides 342 and 352 are the left or port sides of platforms 330 and 331, respectively, and sides 343 and 353 are the right or starboard sides of platforms 330 and 331, respectively.

Figure 21:
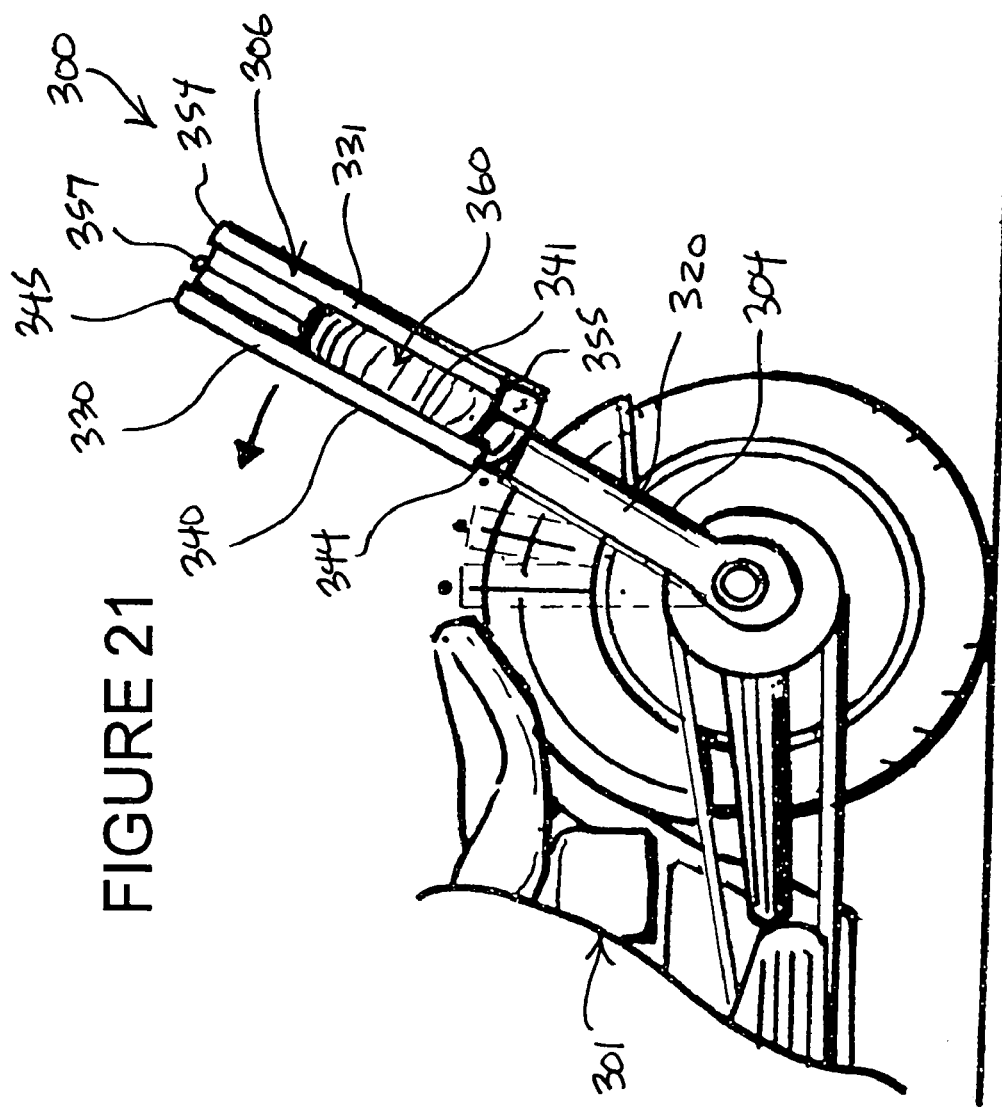
FIG. 21 is a side elevational view of the trailer of FIG. 19 shown as it would appear in a stored position.

Upstream end 354 of downstream platform 331 is mounted to downstream end 345 of upstream platform 330 for pivotal movement with a hinge 357, such as a piano hinge or the like, between a raised position as shown in FIGS. 19, 20, and 24, and a lowered position as seen in FIG. 21 in juxtaposition with upstream platform 330. In the lowered position of downstream platform 331, lower faces 341 and 351 face one another and upstream and downstream platforms 330 and 331 are juxtaposed being substantially parallel relative to one another as shown in FIG. 21. In the raised position of downstream platform 331 as shown in FIGS. 19 and 20, it and upstream platform 330 together form a major platform onto the upper faces 340 and 350 of which cargo may be placed for towing.

Carriage 305 reciprocates relative to platform assembly 306 between retracted and extended positions. In its retracted position, carriage 305 is located entirely underneath lower face 341 of upstream platform 330, which leaves downstream platform 331 free to pivot about hinge 357. In its extended position, carriage 305 is located concurrently underneath lower faces 341 and 351 of upstream and downstream platforms 330 and 331. Carriage 305 is able to assume its extended position when downstream platform 331 is disposed in its raised position as in FIGS. 19 and 20. When carriage 305 is in its extended position, lower face 351 of downstream panel 331 rests against it, in which carriage 305 supports downstream platform 331 in its raised position, in accordance with the principle of the invention.

Carriage 305 supports a wheel assembly 360, which, as seen in FIG. 25, consists of a wheel support 361 having an upper end 362 secured to carriage 205 and that depends downwardly there from away from lower faces 341 and 351 of upstream and downstream platforms 330 and 331, respectively, as shown in FIG. 19, to a lower end 363. A stub axle 364 is mounted to lower end 363 to which a ground-engaging wheel 364 is rotatably mounted in a conventional manner.

Wheel support 361 is mounted to the underside of carriage 305 for pivotal movement with a hinge 366 for movement between an operative position in FIGS. 19, 20, and 22-25 and a stored position as shown in FIG. 21. In its operative position, wheel 365 is in a ground-engaging position in preparation for towing. As seen in FIG. 25, a threaded fastener 367 is mounted for rotation to upper end 362 of wheel support 360 and is received into a corresponding threaded opening formed in the underside of carriage 305, and which may be tightened for securing wheel support 361 in its operative position and loosened for releasing wheel assembly 360 from its locked, operative position. Upon unlocking wheel support 360 from its locked, operative position, wheel support 261 may be pivoted at hinge 366 upwardly in juxtaposition with lower face 341 of upstream platform 330 into its stored position.

Figure 22:
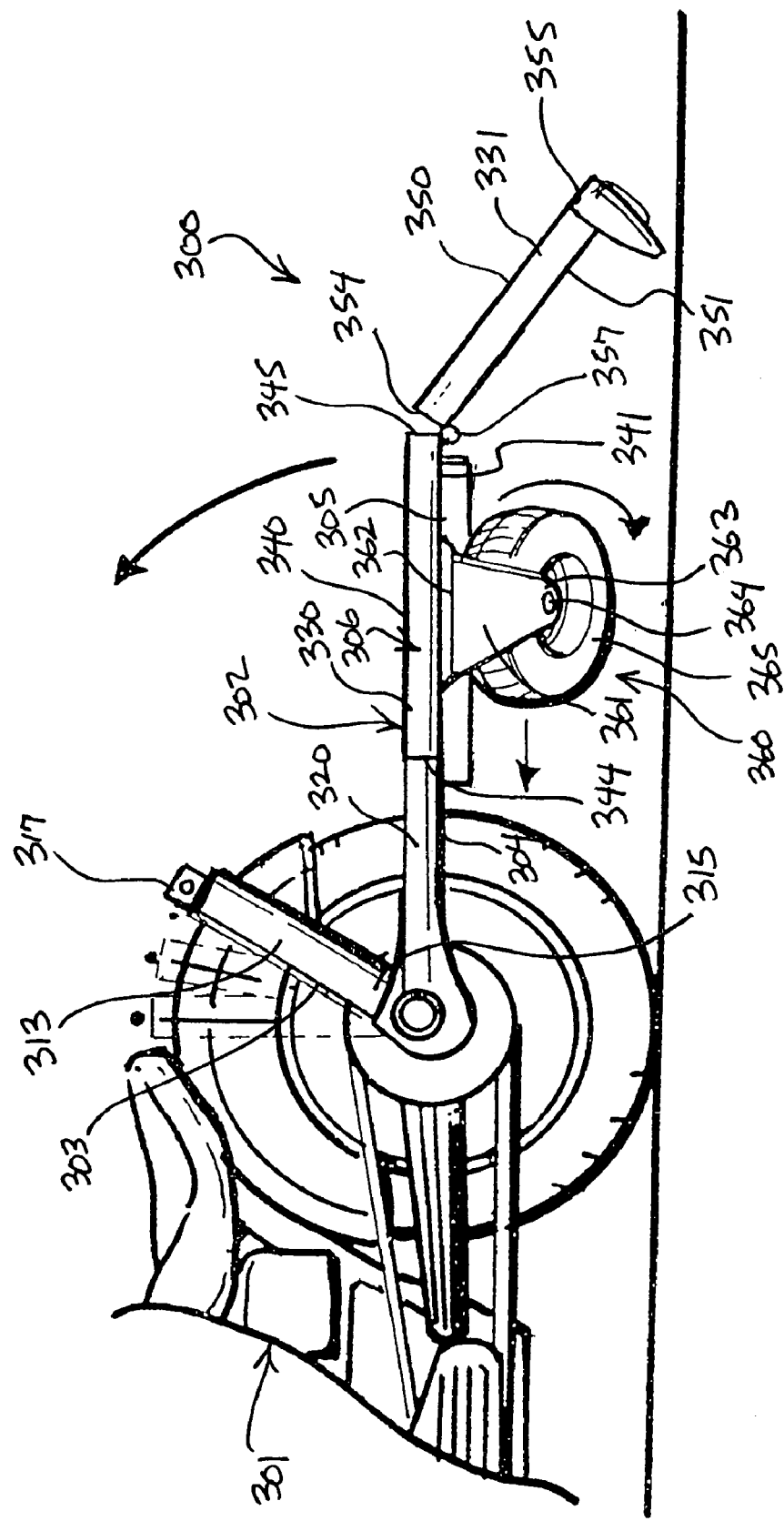

Motorcycle 301 has a front end 370, an opposing rear end 371, and a frame 372, to which lower ends 315 and 316 of brace 303 are rigidly attached on either side of motorcycle 301 at rear end 371, such as by welding, with clamps, bolts, etc. Brace 303 can be angled rearwardly of motorcycle 301 as seen in FIGS. 19 and 22, or disposed in a generally vertical position as seen in FIGS. 23 and 24. Rails 320 and 321 are mounted to lower ends 315 and 316 for pivotal movement with a stub axle pivot mount permitting framework 304 to pivot relative to lower ends 315 and 316 of brace 303 between a lowered position as shown in FIGS. 19, 20, and 24, and a raised position as shown in FIG. 21.

Trailer 300 is movable between a deployed or operative position in FIGS. 19, 20, and 24 for towing, and a stored position in FIG. 21. In the operative position of trailer 300, wheel assembly 360 is locked in its operative position, downstream platform 331 is disposed in its raised position, carriage 305 is disposed in its extended position underlying upstream and downstream platforms 330 and 331, and framework 304 is disposed in its lowered position. In its deployed position, cargo may be placed on to upper faces 340 and 350 of upstream and downstream platforms 330 and 331, and trailer 300 may then be towed behind motorcycle 301, in which wheel assembly 360 provides wheeled mobility for trailer 300.

In the stored position of trailer 300, carriage 305 is disposed in its retracted position, wheel assembly 360 is pivoted into its stored position in juxtaposition with lower face 341 of upstream platform 330, downstream platform 331 is pivoted into its lowered position in juxtaposition with upstream platform 330 capturing wheel assembly 360 therebetween lower faces 341 and 351 of upstream and downstream platforms 330 and 331, respectively, and framework 304 is pivoted upwardly into its raised position. When framework 304 is pivoted upwardly into its raised position, a tongue 375 attached to, and projecting forwardly of, carriage 305 opposes socket 317. To lock trailer 300 in its stored position, carriage 305 is moved toward socket 317 in which tongue 375 is received into socket 317 and then locked in place with a lock pin 376. After locking trailer 300 in its stored position, motorcycle 301 may be driven normally. Reversing this operation unlocks trailer 300 from its locked, stored position and places trailer 300 into its locked, deployed position in preparation for towing.

As a matter of illustration, in FIG. 22 wheel assembly 360 is disposed between its operative and stored position, downstream platform 331 is disposed between its raised and lowered positions, carriage 305 is disposed in its retracted position, and framework 304 is disposed in its lowered position. FIG. 23 is the same as FIG. 22, with the exception that wheel assembly 360 is disposed in its operative position.

Figure 26:
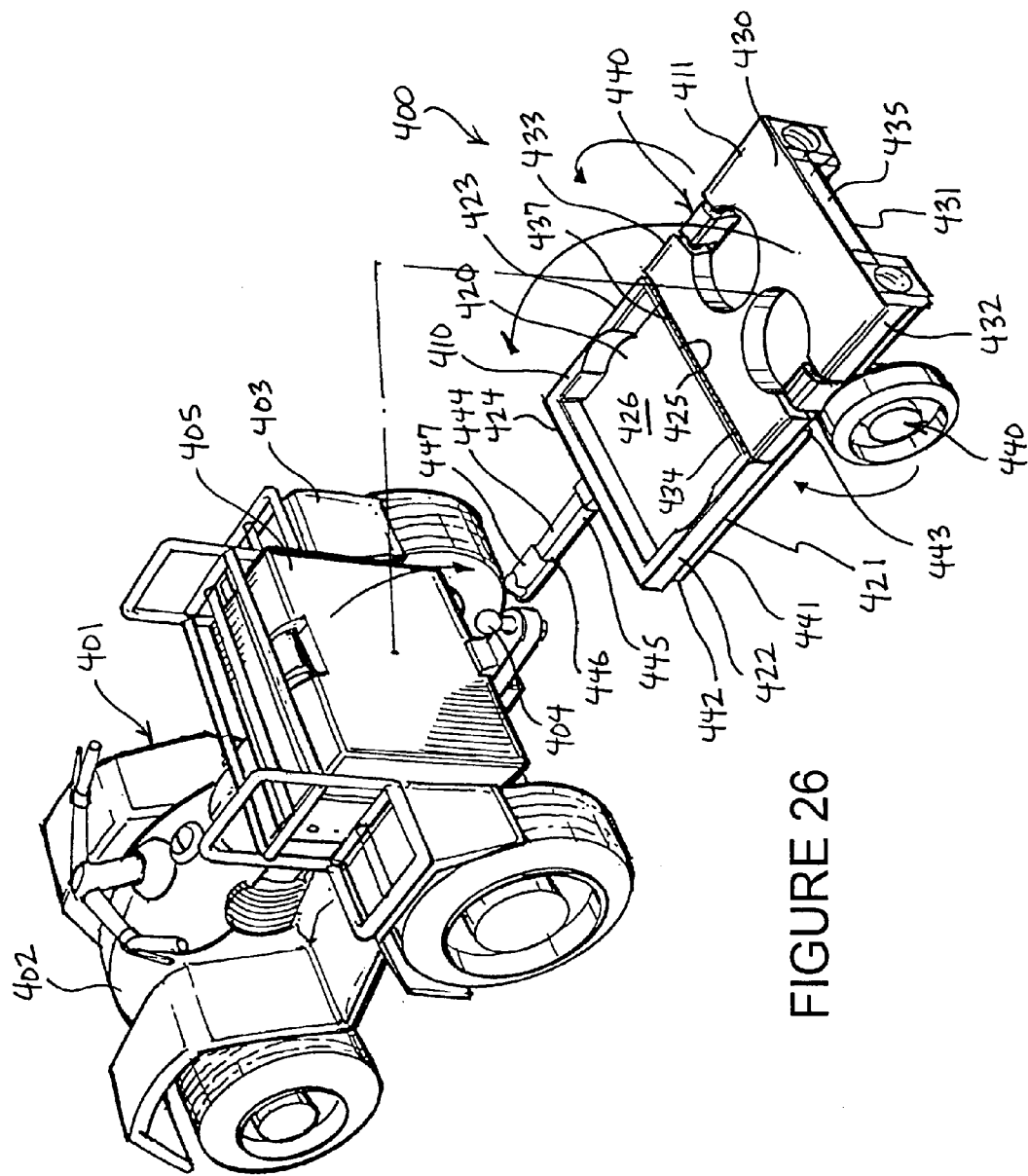
FIG. 26 is a perspective view of a trailer constructed and arranged in accordance with the principle of the invention, and shown as it would appear associated with an all-terrain vehicle.

Reference is now made to FIGS. 26 and 27, in which there is seen a perspective view of yet another embodiment of a trailer 400 constructed and arranged in accordance with the principle of the invention. In FIG. 26, trailer 400 is shown as it would appear associated with an all-terrain vehicle 401 having opposing front and rear ends 402 and 403, a tow bat 404 attached to rear end 403, and trailer storage case 405 supported by vehicle 401 at its rear end 403.

Trailer 400 is movable between a deployed position for towing as in FIGS. 26 and 27, and a stored position. Trailer 400 consists of an upstream platform 410 and a downstream platform 411. Upstream platform 410 is generally flat and includes opposing upper and lower faces 420 and 421, opposing sides 422 and 423, an upstream end 424, and an opposing downstream end 425. A cavity 426 is formed into upper face 420. Downstream platform 411 is generally flat and includes opposing upper and lower faces 430 and 431, opposing sides 432 and 433, an upstream end 434 directed toward downstream end 425 of upstream platform 410, and an opposing downstream end 435. Sides 422 and 432 are the left or port sides of platforms 410 and 411, respectively, and sides 423 and 433 are the right or starboard sides of platforms 410 and 411, respectively. Upstream end 434 of downstream platform 411 is mounted to downstream end 425 of upstream platform 410 for pivotal movement with a hinge 437, such as a piano hinge or the like, between a raised position bringing upper face 420 in juxtaposition with upper face 430 of upstream platform 410, and a lowered position as shown in FIGS. 26 and 27. A wheel assembly 440 is attached to downstream platform 411 at each of sides 432 and 433. Wheel assemblies 440 are each identical to wheel assembly 230 discussed in conjunction with FIGS. 12-18 and are each movable between an operative or deployed position for towing as in FIGS. 26 and 27 and a stored position positioned atop upper face 430. It is to be understood that the previous discussion of wheel assembly 230 applies equally to each wheel assembly 440.

As best seen in FIG. 27, lower face 421 of upstream platform 420 is positioned atop and rigidly affixed to a chassis 441 having opposing upstream and downstream ends 442 and 443. A drawbar 444 has a proximal end 445 removably attached to upstream end 442 and extends forwardly thereof to a distal end 446 having a hitch 447 attached thereto, which is adapted to be hitched to tow bat 404 in preparation for towing trailer 400. In the lowered position of downstream platform 331 as shown in FIGS. 19 and 20, it is supported against downstream end 443 of chassis 441, in which upstream platform 410 and downstream platform 411 together form a major platform onto the upper faces 340 and 350 of which cargo may be placed for towing. To fully deploy trailer 400 for towing, wheel assemblies 440 are disposed in their operative positions disposing their respective wheels in their ground-engaging positions, and drawbar 444 is secured in place. Proximal end 445 of drawbar 444 is secured to chassis 441 in the same way as that proximal end 93 of drawbar 92 is attached to trailer chassis 81 and will not be again discussed.

To place trailer 400 into its stored position, drawbar 444 is detached, wheel assemblies 440 are moved into their stored positions atop upper face 430 of downstream platform 411, and downstream platform 411 is pivoted into its stored position bringing upper face 430 of downstream platform 411 in juxtaposition with upper face 420 of upstream platform 410, in which wheel assemblies 440 become positioned in cavity 426. At this point, drawbar 444 and trailer 400 may be placed into 445 mounted to vehicle 401 for transport. Reversing this operation places trailer 400 into its deployed position in preparation for towing by vehicle 401 when the need arises.

Figure 29:
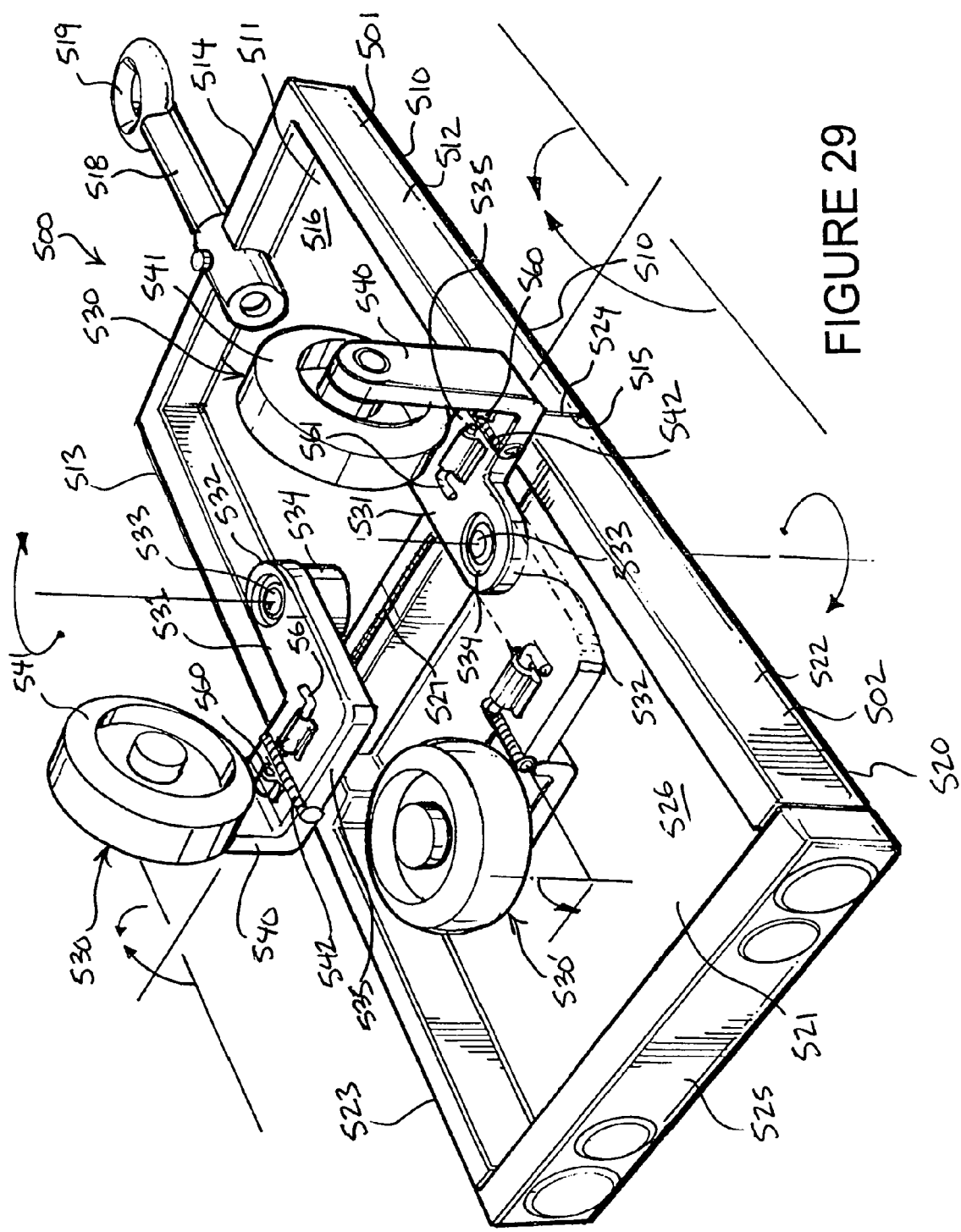
FIG. 29 is a bottom perspective view of the trailer of FIG. 28.

Turning now to FIGS. 28 and 29, illustrated is yet still another embodiment of a trailer 500 constructed and arranged in accordance with the principle of the invention, and which may be towed behind any form of motorized vehicle. As with the previous trailer embodiments, trailer 500 is movable between a deployed position for towing as in FIGS. 28 and 29, and a stored position.

Trailer 500 consists of an upstream platform 501 and a downstream platform 502. Upstream platform 501 is generally flat and includes opposing upper and lower faces 510 and 511, opposing sides 512 and 513, an upstream end 514, and an opposing downstream end 515. A cavity 516 (FIG. 29) is formed into lower face 511. Downstream platform 502 is generally flat and includes opposing upper and lower faces 520 and 521, opposing sides 522 and 523, an upstream end 524 directed toward downstream end 515 of upstream platform 501, and an opposing downstream end 525. Sides 512 and 522 are the left or port sides of platforms 501 and 502, respectively, and sides 513 and 523 are the right or starboard sides of platforms 501 and 502, respectively. A cavity 526 (FIG. 29) is formed into lower face 521. Upstream end 524 of downstream platform 502 is mounted to downstream end 515 of upstream platform 501 for pivotal movement with a hinge 527, such as a piano hinge or the like, between a lowered position bringing lower face 521 of downstream platform 502 in juxtaposition with lower face 511 of upstream platform 501, in which cavities 516 and 526 cooperate forming a storage compartment therebetween. A drawbar 528 is rigidly secured to upstream end 514 of upstream platform 501, and extends forwardly thereof to a circular hitch 529 for attachment to a corresponding circular tow bat in preparation for towing, in which such a hitched engagement pair provides a wide degree of articulation therebetween without risk of detachment, which is desirable when trailer 500 is towed behind a vehicle riding over rough and/or irregular terrain. FIG. 31 shows circular hitch 529 as it would appear secured to a pinned, circular tow bat 550 carried by a U-shaped vehicle coupling 551 adapted to be secured to a motorcycle, all-terrain vehicle, or the like. Although the hitch configuration in FIG. 31 is preferred, FIG. 30 shows an alternate hitch assembly that may be used including a conventional hitch 552 secured to drawbar 518 engagable to a conventional tow bat 553 secured to coupling 551 in lieu of circular tow bat 550 depicted in FIG. 31. It is to be understood that any suitable hitch assembly may be used in conjunction with drawbar 518 for towing trailer 500.

Trailer 500 incorporates a wheel assembly 530 on either of the port and starboard sides of trailer 500. Wheel assemblies 530 are substantially identical to one another and the same reference characters are used to describe each, in which wheel assembly 530 at the starboard side of trailer 500 is considered the starboard side wheel assembly, and wheel assembly 530 at the port side of trailer 500 is considered the port side wheel assembly of trailer 500. Turning now to FIG. 8, wheel assembly 530 at the starboard side of trailer 500 consists of a fixture 531 having a proximal extremity 532 mounted for pivotal movement to a stub axle 533 of a pivot attachment 534 secured to lower face 511 of upstream platform 501. Fixture 531 extends rearwardly toward downstream platform 502 there across hinge 527 from proximal extremity 532 to a distal extremity 535, which confronts lower face 521. Distal extremity 535 kicks laterally outward to a wheel support 540, that incorporates an attached ground-engaging wheel 541, which is mounted to distal extremity 535 with a hinge 542 for pivotal movement between a lowered or deployed position depending away from distal extremity 535 and from lower faces 511 and 521 of upstream and downstream platforms 501 and 502 disposing wheel 541 in an operative, ground-engaging position, and a raised or stored position outwardly of the starboard side of trailer 500.

A locking assembly is provided for locking wheel support 540 in its deployed position, which consists of a pin-receiving support 560 mounted on the underside of wheel support 540 adjacent hinge 542, and a locking pin 561 mounted to distal extremity 535 of fixture 531 for movement in reciprocal directions in opposition to support 560 between a retracted position detached from support 560 and a second position across hinge 542 and into support 560 thereby securing wheel support 540 in its deployed position. Reversing this operation unlocks wheel support 540 from its deployed position and permits it to be pivoted from its deployed position to its raised, stored position outwardly of the starboard side of trailer 500.

Fixture 531 pivots at pivot attachment point 534 between a deployed position and a stored position. In its deployed position, fixture 531 projects rearwardly across hinge 527 to downstream platform 502, in which distal extremity 535 confronts lower face 521 of downstream platform 502. Placing wheel support 540 into its locked, deployed position completes the placement of starboard side wheel assembly 530 as a whole into is deployed position in preparation for towing. In its stored position, fixture 531 projects forwardly of hinge 527 opposing lower face 511. Unlocking wheel support 540 from its deployed position to its stored position positions wheel support 540 into cavity 516 (FIG. 29) opposite distal extremity 535 of fixture 531, which completes the placement of starboard side wheel assembly 530 as a whole into is stored position in preparation for placing trailer 500 into its stored position from its deployed position.

Like wheel assembly 530 at starboard side of trailer 500, wheel assembly 530 at the port side of trailer 500 consists of fixture 531 having proximal extremity 532 mounted for pivotal movement to stub axle 533 of pivot attachment 534 secured to lower face 521 of upstream downstream platform 502. Fixture 531 extends forwardly toward upstream platform 501 there across hinge 527 from proximal extremity 532 to distal extremity 535, which confronts lower face 511. Distal extremity 535 kicks laterally outward to wheel support 540, which is mounted to distal extremity 535 with hinge 542 for pivotal movement between a lowered or deployed position depending away from distal extremity 535 and from lower faces 511 and 521 of upstream and downstream platforms 501 and 502 disposing wheel 541 in its operative, ground-engaging position, and a raised or stored position outwardly of the port side of trailer 500.

The locking assembly is provided for locking wheel support 540 in its deployed position, which consists of a pin-receiving support 560 mounted on the underside of wheel support 540 adjacent hinge 542, and locking pin 561 mounted to distal extremity 535 of fixture 531 for movement in reciprocal directions in opposition to support 560 between a retracted position detached from support 560 and a second position across hinge 542 and into support 560 thereby securing wheel support 540 in its deployed position. Reversing this operation unlocks wheel support 540 from its deployed position and permits it to be pivoted from its deployed position to its raised, stored position outwardly of the port side of trailer 500.

Fixture 531 pivots at pivot attachment point 534 between a deployed position and a stored position. In its deployed position, fixture 531 projects forwardly across hinge 527 to upstream platform 501, in which distal extremity 535 confronts lower face 511 of upstream platform 501. Placing wheel support 540 at the port side of trailer 500 into its locked, deployed position completes the placement of the port side wheel assembly 530 as a whole into is deployed position in preparation for towing. In its stored position, fixture 531 projects rearwardly of hinge 527 opposing lower face 521. Unlocking wheel support 540 of the port side wheel assembly 530 from its deployed position to its stored position positions wheel support 540 into cavity 526 opposite distal extremity 535 of fixture 530, which completes the placement of the port side wheel assembly 530 as a whole into its stored position in preparation for placing trailer 500 into its stored position from its deployed position. In FIG. 29, the port side wheel assembly is denoted at 530' as it would appear in its stored position.

As previously mentioned, trailer 500 is movable between a deployed position for towing as in FIGS. 28 and 29, and a stored position. In the deployed position of trailer 500, downstream platform 502 is disposed in its raised position in which upstream platform 501 and downstream platform 502 together form a major platform onto the upper faces 510 and 520 of which cargo may be placed for towing. To fully deploy trailer 500 for towing, wheel assemblies 530 are placed and locked into their operative positions. In the operative positions of the starboard side and port side wheel assemblies 530, fixtures traverse hinge 542, and interact with upstream and downstream platforms 501 and 502 together functioning to support upstream and downstream platforms 501 and 502 and prevent downstream platform 502 from pivoting out of its raised position into its lowered position.

To place trailer 500 into its stored position, wheel assemblies 530 are moved into their stored positions at cavities 516 and 526, respectively, and downstream platform 502 is pivoted into its stored position bringing its lower face 511 in juxtaposition with lower face 521 of upstream platform 501, in which cavities 516 and 526 thereby cooperate forming a storage compartment containing wheel assemblies 530, in accordance with the principle of the invention. When placed into its stored position, trailer 500 is compact and may be easily stored when not in use.

According to the principle of the invention, attention is now directed to FIGS. 32 and 33, in which there is seen yet still a further embodiment of a trailer 600 that is uniquely designed to be towed in snowy/icy surfaces, such as behind a snowmobile 601 as shown in FIG. 32 or other snow-going vehicle. In this embodiment, trailer 600 a plurality of hingedly attached trailer panels 610,611,612 that may be folded together compactly and carried on the back of snowmobile 601, and unfolded and hitched to snowmobile 601 for towing cargo thereon, in which trailer 600 slides across the snowy/icy surface much like a sled. In this embodiment, panel 610 is the upstream panel of trailer 600 and incorporates a tow bat 615 adapted to be coupled to a hitch 616 (FIG. 32) formed in the back of snowmobile 601, panel 612 is the downstream panel of trailer 600, and panel 611 is the intermediate panel of trailer 600. Panels 610,611,612 are hingedly attached end to end in series with conventional piano hinges 618 or the like.

Figure 34:
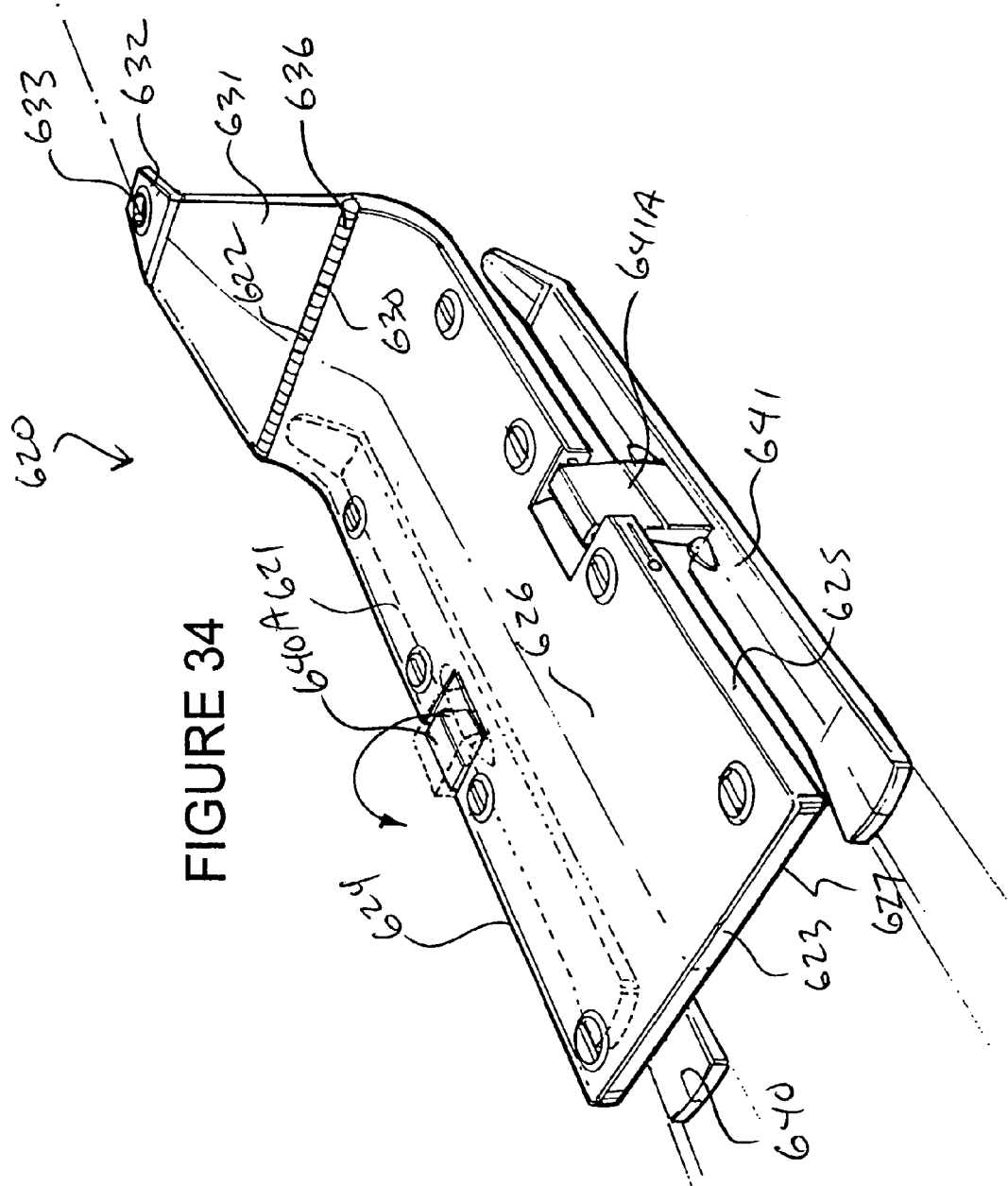
FIG. 34 is a perspective view of yet another embodiment of a sled trailer constructed and arranged in accordance with the principle of the invention.

According to the principle of the invention, attention is now finally directed to FIG. 34, in which there is seen yet another embodiment of a trailer 620 that is uniquely designed to be towed in snowy/icy surfaces, such as behind a snowmobile or other snow-going vehicle. In this embodiment, trailer 620 includes a main trailer platform 621 having opposing forward and rearward ends 622 and 623, and opposing sides 624 and 625, an upper face 626 onto which cargo may be placed for towing and an opposing lower faces 627. Forward end 622 is mounted for pivotal movement to an outer end 630 of a support 631 with a hinge 636, such as a piano hinge or other suitable hinge. Support 631 also has opposing inner end 632 incorporating a hitch 633 that is adapted to be hitched to a tow bat at the rear end of a snowmobile or other snow-going vehicle for towing trailer 620 there behind.

Side 624 is the left or port side of trailer 620 and side 625 is the right or starboard side of trailer 620. Opposed port and starboard side skis 640 and 641 are provided, which incorporate upstanding mounts 640A and 641A respectively, which are mounted to sides 624 and 625, respectively, for pivotal movement of skis 640 and 641 between lowered, deployed, or operative positions depending downwardly from lower face 627 of platform 621 in preparation for towing and raised, inoperative, or stored positions in juxtaposition with upper face 626 of platform 621 for storage of trailer 620 during periods of nonuse. In their deployed positions, skis 640 and 641 ride along the snow or icy surfaces supporting platform 621 at an elevated location for towing. During periods of nonuse, support 631 may be pivoted in juxtaposition with upper face 626 for providing compact storage of trailer 620.

The present invention is described above with reference to preferred embodiments. However, those skilled in the art will recognize that changes and modifications may be made in the described embodiments without departing from the nature and scope of the present invention and that elements and complemental elements of engagement/attachment/coupling pairs can be reversed. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. A trailer, comprising:
   a trailer chassis;
   a first platform affixed to the trailer chassis;
   a second platform;
   wheel assemblies each mounted to the second platform for movement between a stored position relative to the second platform and a groundengaging position relative to the second platform; and
   the second platform mounted to the first platform for pivotal movement between a first position in juxtaposition with the first platform locating each wheel assembly in the stored position between the first and second platforms, and a lowered position against the chassis extending away from the first platform and together with the first platform forming a major platform adapted to receive cargo.

2. Apparatus according to claim 1, further comprising:
   a cavity formed in the first platform; and
   each wheel assembly in the stored position received in the cavity in the first position of the second platform.

3. Apparatus according to claim 1, further comprising a drawbar attached to the trailer chassis and projecting away from the first platform to a free end carrying a trailer hitch.

4. A trailer, comprising:
- a first platform having a first upper face and an opposing first lower face;
- a first wheel assembly mounted to the first lower face of the first platform for movement between a stored position relative to the first lower face of the first platform and an operative, groundengaging position relative to the first lower face of the first platform;
- a second platform having a second upper face and an opposing second lower face;
- a second wheel assembly mounted to the second lower face of the second platform for movement between a stored position relative to the second lower face of the second platform and an operative, groundengaging position relative to the second lower face of the second platform;
- the second platform mounted to the first platform for pivotal movement between a first position bringing the second lower face of the second platform in juxtaposition with the first lower face of the first platform locating each wheel assembly in the stored position between the first and second lower faces of the first and second platforms, respectively, and a second position away from the first platform extending away from the first platform and together with the first platform forming a major platform adapted to receive cargo on the first and second upper faces of the first and second platforms;
- in the operative, groundengaging positions of the first and second wheel assemblies in the second position of the second platform, the first and second wheel assemblies interacting between the first and second platforms preventing the second platform from moving into the first position from the second position; and
- in the stored positions of the first and second wheel assemblies in the second position of the second platform, the first and second wheel assemblies allowing the second platform to pivot into the first position from the second position.

5. The trailer according to claim 4, further comprising:
- the first and second lower faces of the first and second platforms forming a storage compartment in the first position of the second platform; and
- the first and second wheel assemblies contained in the storage compartment in the stored positions of the first and second wheel assemblies and the first position of the second platform.

6. The trailer according to claim 4, further comprising:
- a first locking assembly for locking the first wheel assembly in the operative, groundengaging position; and
- a second locking assembly for locking the second wheel assembly in the operative, groundengaging position.

7. The trailer according to claim 4, further comprising a drawbar attached to the first platform and projecting away from the first platform to a free end carrying a trailer hitch.

* * * * *